United States Patent
Seok

(10) Patent No.: US 12,362,790 B2
(45) Date of Patent: *Jul. 15, 2025

(54) METHOD AND APPARATUS FOR UPLINK MULTI-USER TRANSMISSION IN A HIGH EFFICIENCY WIRELESS LAN

(71) Applicant: Atlas Global Technologies LLC, Austin, TX (US)

(72) Inventor: Yongho Seok, Irvine, CA (US)

(73) Assignee: Atlas Global Technologies LLC, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/403,919

(22) Filed: Jan. 4, 2024

(65) Prior Publication Data

US 2024/0137080 A1  Apr. 25, 2024

Related U.S. Application Data

(63) Continuation of application No. 17/061,449, filed on Oct. 1, 2020, now Pat. No. 11,909,469, which is a continuation of application No. 16/150,196, filed on Oct. 2, 2018, now Pat. No. 10,840,979, which is a continuation of application No. 15/136,803, filed on Apr. 22, 2016, now Pat. No. 10,116,360.

(Continued)

(51) Int. Cl.
*H04B 7/0452* (2017.01)
*H04L 1/1829* (2023.01)
*H04W 74/0816* (2024.01)
*H04W 84/12* (2009.01)

(52) U.S. Cl.
CPC ......... *H04B 7/0452* (2013.01); *H04L 1/1854* (2013.01); *H04W 74/0816* (2013.01); *H04W 84/12* (2013.01)

(58) Field of Classification Search
None
See application file for complete search history.

(56) References Cited

U.S. PATENT DOCUMENTS 9,462,504 B2    10/2016  Stephens et al.
10,116,360 B2 *  10/2018  Seok ................. H04W 74/0816
(Continued)

OTHER PUBLICATIONS

** LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2; Sub 1 GHz License Exempt Operation," Mar. 2015.

(Continued)

*Primary Examiner* — Xavier S Wong
(74) *Attorney, Agent, or Firm* — Nutter McClennen & Fish LLP

(57) ABSTRACT

A method for a backoff process for uplink (UL) random access is provided. The method may include one or more of receiving, by a station (STA) eligible to participate in a UL MU transmission, a UL trigger frame indicating that one or more anonymous users are eligible to participate in the UL multiuser (MU) transmission, randomly selecting, by the STA, one or more resource units (RUs), and transmitting, by the STA, the UL MU transmission.

27 Claims, 26 Drawing Sheets

Related U.S. Application Data

(60) Provisional application No. 62/307,033, filed on Mar. 11, 2016, provisional application No. 62/205,577, filed on Aug. 14, 2015, provisional application No. 62/183,688, filed on Jun. 23, 2015, provisional application No. 62/181,725, filed on Jun. 18, 2015, provisional application No. 62/159,170, filed on May 8, 2015, provisional application No. 62/151,966, filed on Apr. 23, 2015.

(56) References Cited

U.S. PATENT DOCUMENTS

| | | | |
|---|---|---|---|
| 10,182,361 B1 | 1/2019 | Moon et al. | |
| 10,840,978 B2 | 11/2020 | Seok | |
| 10,840,979 B2* | 11/2020 | Seok | H04L 1/1854 |
| 11,477,844 B2 | 10/2022 | Son et al. | |
| 11,503,633 B2 | 11/2022 | Zhang et al. | |
| 11,809,469 B1 | 11/2023 | Seok | |
| 11,909,469 B2* | 2/2024 | Seok | H04B 7/0452 |
| 2005/0237984 A1 | 10/2005 | Benveniste | |
| 2006/0268886 A1 | 11/2006 | Sammour et al. | |
| 2008/0002615 A1 | 1/2008 | Nakajima et al. | |
| 2008/0013498 A1 | 1/2008 | Dalmases et al. | |
| 2010/0220679 A1 | 9/2010 | Abraham et al. | |
| 2011/0223932 A1* | 9/2011 | Hole | H04W 74/0866 |
| | | | 455/422.1 |
| 2011/0317569 A1* | 12/2011 | Kneckt | H04W 8/005 |
| | | | 370/252 |
| 2015/0016437 A1 | 1/2015 | Wentink | |
| 2015/0063318 A1 | 3/2015 | Merlin et al. | |
| 2015/0124690 A1 | 5/2015 | Merlin et al. | |
| 2016/0037364 A1 | 2/2016 | Kairouz et al. | |
| 2016/0157266 A1 | 6/2016 | Wang et al. | |
| 2016/0315675 A1 | 10/2016 | Seok | |
| 2016/0316472 A1* | 10/2016 | Kwon | H04W 12/06 |
| 2017/0055279 A1 | 2/2017 | Janis et al. | |
| 2017/0127269 A1 | 5/2017 | Ryu et al. | |
| 2017/0223665 A1 | 8/2017 | Chun et al. | |
| 2017/0279570 A1* | 9/2017 | Kim | H04L 5/0007 |
| 2017/0310424 A1 | 10/2017 | Chun et al. | |
| 2018/0007661 A1 | 1/2018 | Chun et al. | |
| 2018/0167882 A1* | 6/2018 | Choi | H04W 72/0446 |
| 2018/0310330 A1 | 10/2018 | Chun et al. | |
| 2019/0044586 A1 | 2/2019 | Seok | |
| 2021/0028833 A1 | 1/2021 | Seok | |

OTHER PUBLICATIONS

** LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4 Enhancements for Very High Throughput for Operation in Bands below 6 GHz," 2013.

** LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

FIG. 11

| L-STF | L-LTF | L-SIG | HE-SIG-A | HE-STF | HE-LTF | HE-LTF | HE-LTF | HE-LTF | HE-SIG-B | PSDU(AP TO STA6) |
|---|---|---|---|---|---|---|---|---|---|---|
| | | | | HE-STF | HE-LTF | HE-LTF | HE-LTF | HE-LTF | HE-SIG-B | PSDU(AP TO STA5) |
| | | | | HE-STF | HE-LTF | HE-LTF | HE-LTF | HE-LTF | HE-SIG-B | PSDU(AP TO STA3, STA4) |
| | | | | HE-STF | HE-LTF | HE-LTF | HE-LTF | HE-LTF | HE-SIG-B | PSDU(AP TO STA1, STA2) |

FIG. 12

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(AP TO STA6) |
|---|---|---|---|---|---|---|---|---|---|---|---|---|
| | | | | HE-STF | HE-LTF | HE-SIG-B | HE-LTF | HE-LTF | HE-LTF | HE-LTF | HE-SIG-C | PSDU(AP TO STA5) |
| | | | | HE-STF | HE-LTF | HE-SIG-B | HE-LTF | HE-LTF | HE-LTF | HE-LTF | HE-SIG-C | PSDU(AP TO STA3, STA4) |
| | | | | HE-STF | HE-LTF | HE-SIG-B | HE-LTF | HE-LTF | HE-LTF | HE-LTF | HE-SIG-C | PSDU(AP TO STA1, STA2) |

FIG. 15

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(STA4 TO AP) |
|---|---|---|---|---|---|---|---|---|---|---|---|---|
| | | | | HE-STF | HE-LTF | HE-SIG-B | HE-LTF | HE-LTF | HE-LTF | HE-LTF | HE-SIG-C | PSDU(STA3 TO AP) |
| | | | | HE-STF | HE-LTF | HE-SIG-B | HE-LTF | HE-LTF | HE-LTF | HE-LTF | HE-SIG-C | PSDU(STA2 TO AP) |
| | | | | HE-STF | HE-LTF | HE-SIG-B | HE-LTF | HE-LTF | HE-LTF | HE-LTF | HE-SIG-C | PSDU(STA1 TO AP) |

METHOD AND APPARATUS FOR UPLINK MULTI-USER TRANSMISSION IN A HIGH EFFICIENCY WIRELESS LAN

PRIORITY

This patent application is a continuation of pending application Ser. No. 17/061,449, filed on Oct. 1, 2020, which is a continuation of U.S. application Ser. No. 16/150,196, filed on Oct. 2, 2018, now U.S. Pat. No. 10,840,979, which is a continuation of U.S. application Ser. No. 15/136,803, filed on Apr. 22, 2016, now U.S. Pat. No. 10,116,360, which claims the benefit of U.S. Provisional Application No. 62/151,966, filed on Apr. 23, 2015, U.S. Provisional Application No. 62/159,170, filed on May 8, 2015, U.S. Provisional Application No. 62/181,725, filed on Jun. 18, 2015, U.S. Provisional Application No. 62/183,688, filed on Jun. 23, 2015, U.S. Provisional Application No. 62/205,577, filed on Aug. 14, 2015, and U.S. Provisional Application No. 62/307,033, filed on Mar. 11, 2016, the entirety of each of which is incorporated herein by reference for all purposes.

FIELD

Illustrative embodiments of the invention generally relate to Wireless Local Area Networks (WLANs), and more particularly, various embodiments of the invention relate to a method and apparatus for uplink multi-user transmission in a High Efficiency WLAN (HEW).

BACKGROUND

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

In recent times, to support increased numbers of devices supporting WLAN, such as smartphones, more Access Points (APs) have been deployed. Despite increase in use of WLAN devices supporting the Institute of Electrical and Electronics Engineers (IEEE) 802.11ac standard, that provide high performance relative to WLAN devices supporting the legacy IEEE 802.11g/n standard, a WLAN system supporting higher performance is required due to WLAN users' increased use of high volume content such as a ultra-high definition video. Although a conventional WLAN system has aimed at increase of bandwidth and improvement of a peak transmission rate, actual users thereof could not feel drastic increase of such performance.

In a task group called IEEE 802.11ax, High Efficiency WLAN (HEW) standardization has been under discussion. The HEW aims at improving performance felt by users demanding high-capacity, high-rate services while supporting simultaneous access of numerous stations in an environment in which a plurality of APs is densely deployed and coverage areas of APs overlap.

No specified methods or apparatus for transmission opportunity limits, backoff procedures, uplink random access related to uplink multi-user transmission in High Efficiency WLAN (HEW) have been provided.

SUMMARY OF VARIOUS EMBODIMENTS

The present disclosure describes embodiments of a method and apparatus for transmission opportunity limits, backoff procedures, uplink random access related to uplink multi-user transmission in HEW.

The embodiments contemplated by the present disclosure are not limited to the foregoing descriptions, and additional embodiments will become apparent to those having ordinary skill in the pertinent art to the present disclosure based upon the following descriptions.

In an aspect of the present disclosure, a method for a backoff process for uplink (UL) random access may be provided. The method may include receiving, by a station (STA) eligible to participate in a UL MU transmission, a UL trigger frame indicating that one or more anonymous users are eligible to participate in the UL multiuser (MU) transmission, randomly selecting, by the STA, one or more resource units (RUs), and transmitting, by the STA, the UL MU transmission.

In another aspect of the present disclosure, a station (STA) for facilitating multi-user communication in a wireless network may be provided. The STA may include one or more memories and one or more processors coupled to the one or more memories. The one or more processors are configured to receive an uplink (UL) trigger frame, determine the UL trigger frame includes an indication that one or more anonymous users are eligible to participate in a UL multiuser (MU) transmission, randomly select one or more resource units (RUs), and transmit the UL MU transmission.

In another aspect of the present disclosure, a non-transitory computer-readable medium storing computer-executable instructions may be provided. When executed by one or more processors, the instructions may cause the processor to perform receiving, by a station (STA) eligible to participate in a UL MU transmission, a UL trigger frame indicating that one or more anonymous users are eligible to participate in the UL multiuser (MU) transmission, randomly selecting, by the STA, one or more resource units (RUs), and transmitting, by the STA, the UL MU transmission.

It is to be understood that the foregoing summarized features are exemplary aspects of the following detailed description of the present disclosure and are not intended to limit the scope of the present disclosure.

According to the present disclosure, a method and apparatus for transmission opportunity limits, backoff procedures, uplink random access related to uplink multi-user transmission in HEW can be provided.

The advantages of the present disclosure are not limited to the foregoing descriptions, and additional advantages will become apparent to those having ordinary skill in the pertinent art to the present disclosure based upon the following descriptions.

Illustrative embodiments of the invention may be implemented as a computer program product having a computer usable medium with computer readable program code thereon. The computer readable code may be read and utilized by a computer system in accordance with conventional processes.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 11 depicts the starting and ending points of a High Efficiency Long Training Field (HE-LTF) field in a HE PPDU frame format according to the present disclosure.

FIG. 12 depicts a High Efficiency SIGnal B (HE-SIG-B) field and a High Efficiency SIGnal C (HE-SIG-C) field in the HE PPDU frame format according to the present disclosure.

FIG. 15 depicts another exemplary HE PPDU frame format according to the present disclosure.

DESCRIPTION OF ILLUSTRATIVE EMBODIMENTS

Figure 1:
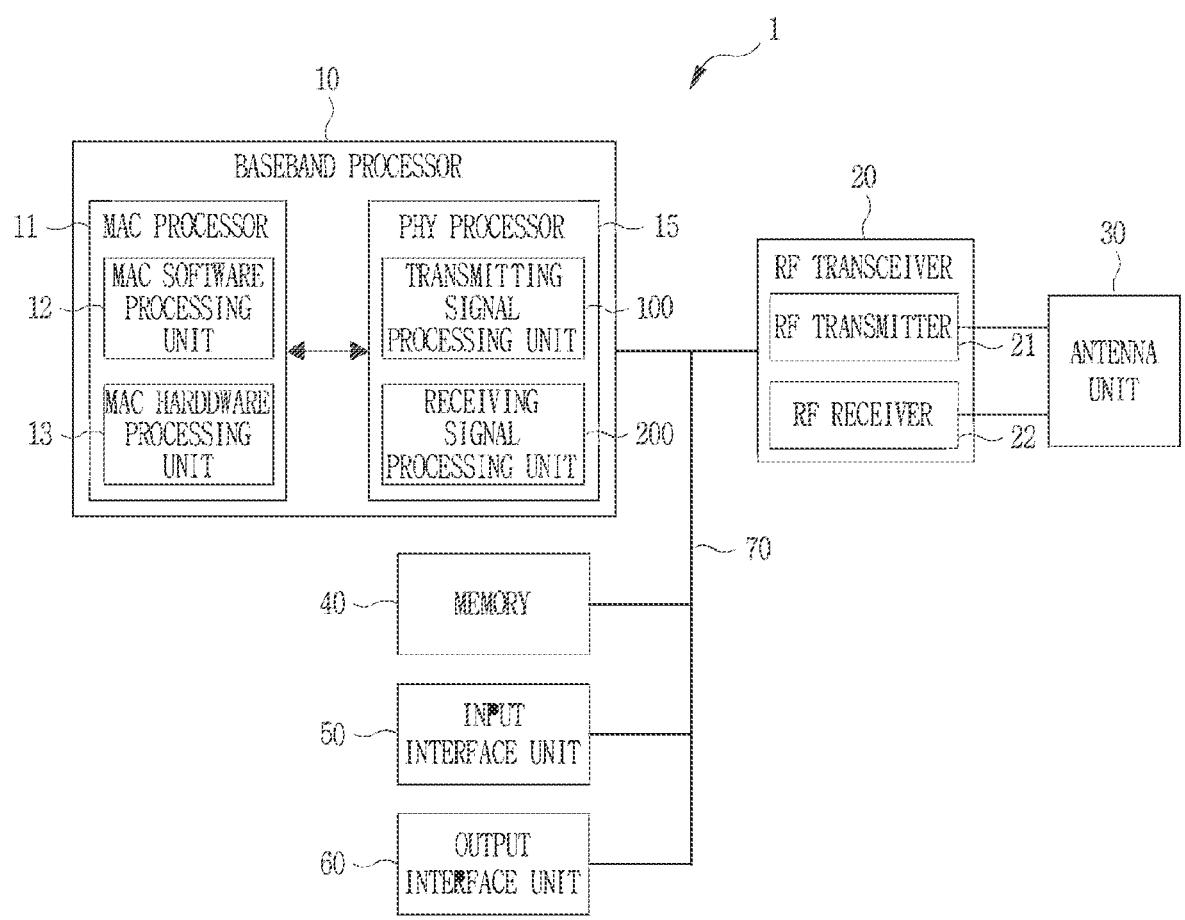
FIG. 1 is a block diagram of a Wireless Local Area Network (WLAN) device.

In the following detailed description, certain embodiments of the present disclosure have been shown and described, by way of illustration. As those skilled in the art would realize, the described embodiments may be modified in various different ways, without departing from the spirit or scope of the present disclosure. Accordingly, the drawings and description are to be regarded as illustrative in nature and not restrictive. Like reference numerals designate like elements throughout the present disclosure.

In a Wireless Local Area network (WLAN), a Basic Service Set (BSS) may include a plurality of WLAN devices. A WLAN device may include a Medium Access Control (MAC) layer and a Physical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STAs and non-AP STAs may be each referred to as a STA or may be collectively referred to as STAs. However, for ease of description herein, only the non-AP STAs may be referred to herein as STAs.

FIG. 1 is a block diagram of a WLAN device. Referring to FIG. 1, a WLAN device 1 includes a baseband processor 10, a Radio Frequency (RF) transceiver 20, an antenna unit 30, a memory 40, which may be or may include a non-transitory computer-readable medium, an input interface unit 50, an output interface unit 60, and a bus 70. The baseband processor 10 may be simply referred to as a processor and may perform baseband signal processing described in the present disclosure, and includes a MAC processor (or MAC entity) 11 and a PHY processor (or PHY entity) 15.

In an embodiment of the present disclosure, the MAC processor 11 may include a MAC software processing unit 12 and a MAC hardware processing unit 13. The memory may store software or machine-executable instructions (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, embodiments of the MAC processor 11 are not limited to this distribution of functionality.

The PHY processor 15 may include a transmitting (TX) signal processing unit 100 and a receiving (RX) signal processing unit 200. The baseband processor 10, the RF transceiver 20, the memory 40, the input interface unit 50, and the output interface unit 60 may communicate with one another via the bus 70. The RF transceiver 20 may include an RF transmitter 21 and an RF receiver 22.

The memory 40 may further store an Operating System (OS) and applications. The input interface unit 50 receives information from a user, and the output interface unit 60 outputs information to the user. The antenna unit 30 includes one or more antennas. When Multiple Input Multiple Output (MIMO) or Multi-User MIMO (MU-MIMO) is used, the antenna unit 30 may include a plurality of antennas.

Figure 2:
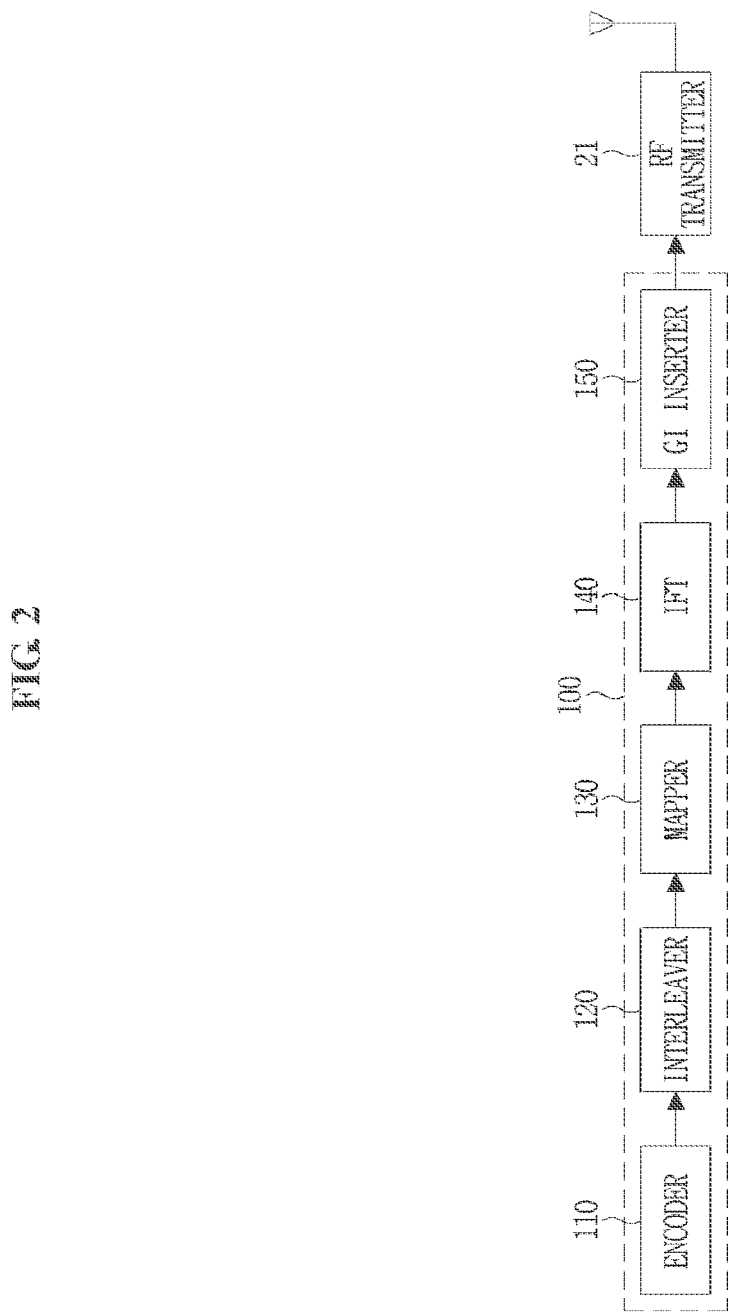
FIG. 2 is a schematic block diagram of an exemplary transmitting signal processing unit in a WLAN.

FIG. 2 is a schematic block diagram of an exemplary transmitting signal processor in a WLAN. Referring to FIG. 2, the transmitting signal processing unit 100 may include an encoder 110, an interleaver 120, a mapper 130, an Inverse Fourier Transformer (IFT) 140, and a Guard Interval (GI) inserter 150. The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, NSS. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the NSS spatial streams into NSTS space-time streams and a spatial mapper for mapping the space-time streams to transmit chains. The spatial mapper may use direct mapping, spatial expansion, or beamforming.

The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming. The CSD insertion may occur before or after IFT. The CSD may be specified per transmit chain or may be specified per space-time stream. Alternatively, the CSD may be applied as a part of the spatial mapper. When MU-MIMO is used, some blocks before the spatial mapper may be provide for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
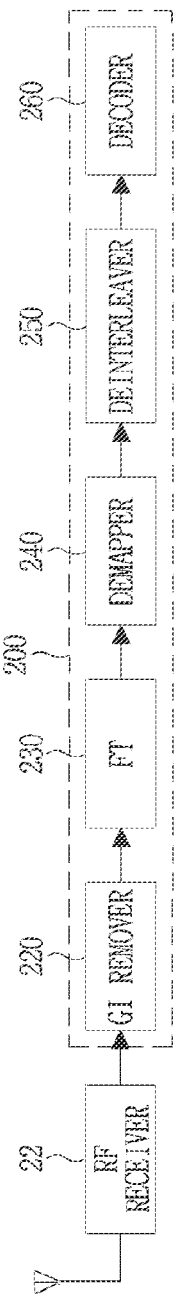
FIG. 3 is a schematic block diagram of an exemplary receiving signal processing unit in a WLAN.

FIG. 3 is a schematic block diagram of an exemplary receiving signal processor in a WLAN. Referring to FIG. 3, the receiving signal processing unit 200 includes a GI remover 220, a Fourier Transformer (FT) 230, a demapper 240, a deinterleaver 250, and a decoder 260. An RF receiver 22 receives an RF signal via the antenna unit 30 and converts the RF signal into one or more symbols. The GI remover 220 removes the GI from the symbol.

When MIMO or MU-MIMO is used, the RF receiver 22 and the GI remover 220 may be provided for each receive chain. The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may use/include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, or colloquially as a 'listen before talk' access mechanism. According to the CSMA/CA mechanism, an AP and/or a STA may sense a medium or a channel for a predetermined time before starting transmission, that is, the AP and/or the STA may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in less collisions.

Figure 4:
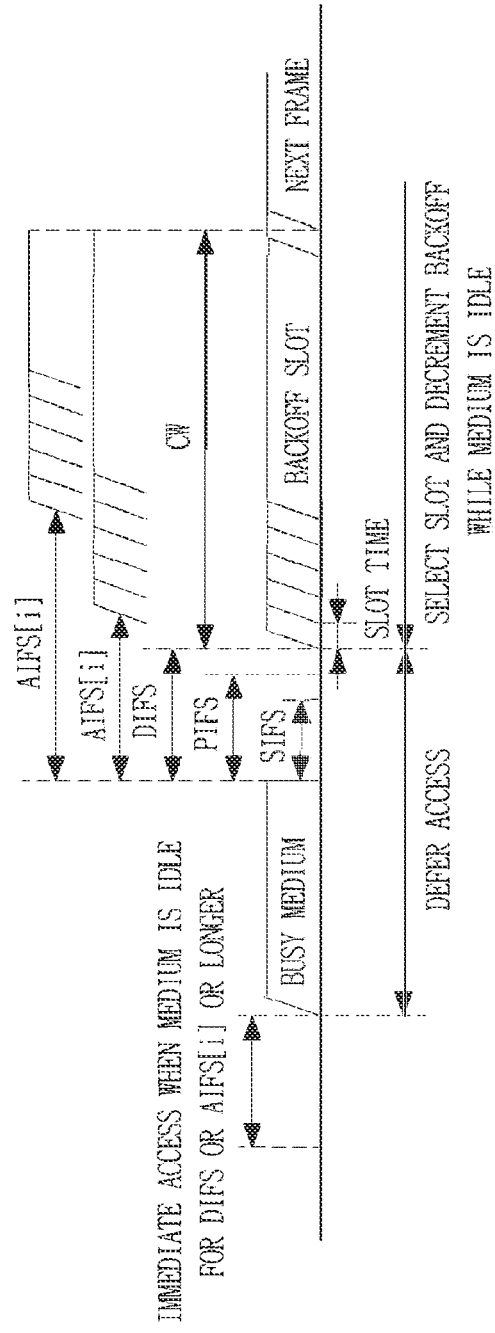
FIG. 4 depicts a relationship between InterFrame Spaces (IFSs).

FIG. 4 depicts a relationship between InterFrame Spaces (IFSs). WLAN devices may exchange data frames, control frames, and management frames with each other. A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium Subtype frames of the control frame include a Request-To-Send (RTS) frame, a Clear-To-Send (CTS) frame, and an Acknowledgement (ACK) frame. In the case that the control frame is not a response frame to a previous frame, the WLAN device transmits the control frame after performing backoff if the DIFS has elapsed. In case that the control frame is a response frame to a previous frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (where i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium is idle, the STA that intends to transmit the frame may perform a backoff operation after a predetermined IFS in order to minimize collision with any other STA Specifically, the STA that intends to transmit the frame selects a random backoff count, waits for a slot time corresponding to the selected random backoff count, and then attempts transmission. The random backoff count is determined based on a Contention Window (CW) parameter and the medium is monitored continuously during countdown of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
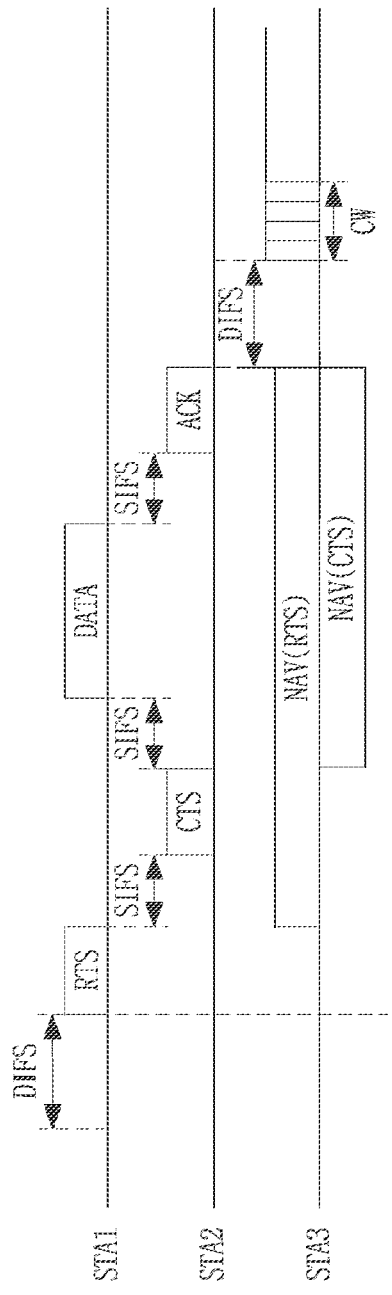
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel. Referring to FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer. After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed. When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
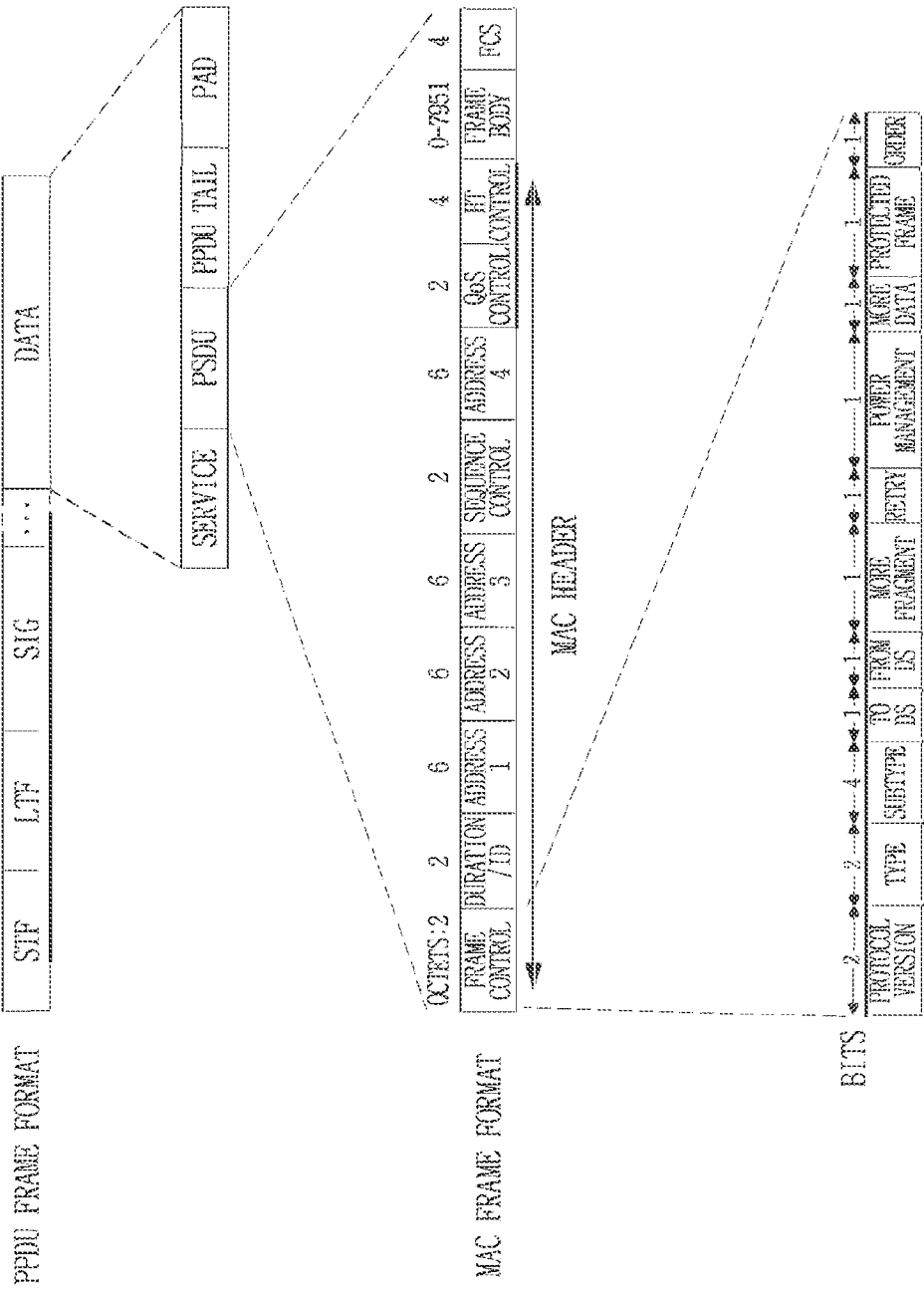
FIG. 6 depicts an exemplary frame structure in a WLAN system.

FIG. 6 depicts an exemplary frame structure in a WLAN system. The PHY layer may prepare for transmission of a MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer. Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy LTF (L-LTF) field, a SIG field, and a Data field. Additional (or other types of) STF, LTF, and SIG fields may be included between the SIG field and the Data field according to the type of PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The L TF field is used for channel estimation, frequency error estimation, etc. The STF and the LTF fields may be referred to as signals for Orthogonal Frequency Division Multiplexing (OFDM) PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc. The Data field may include a SERVICE field, a Physical layer Service Data Unit (PSDU), and PPDU TAIL bits. When needed, the Data field may further include padding bits. Some of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification, which is hereby incorporated by reference.

The Frame Control field of the MAC header may include Protocol Version, Type, Subtype, To Distribution System (DS), From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present disclosure defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HExyz' in the following descriptions).

In present disclosure, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
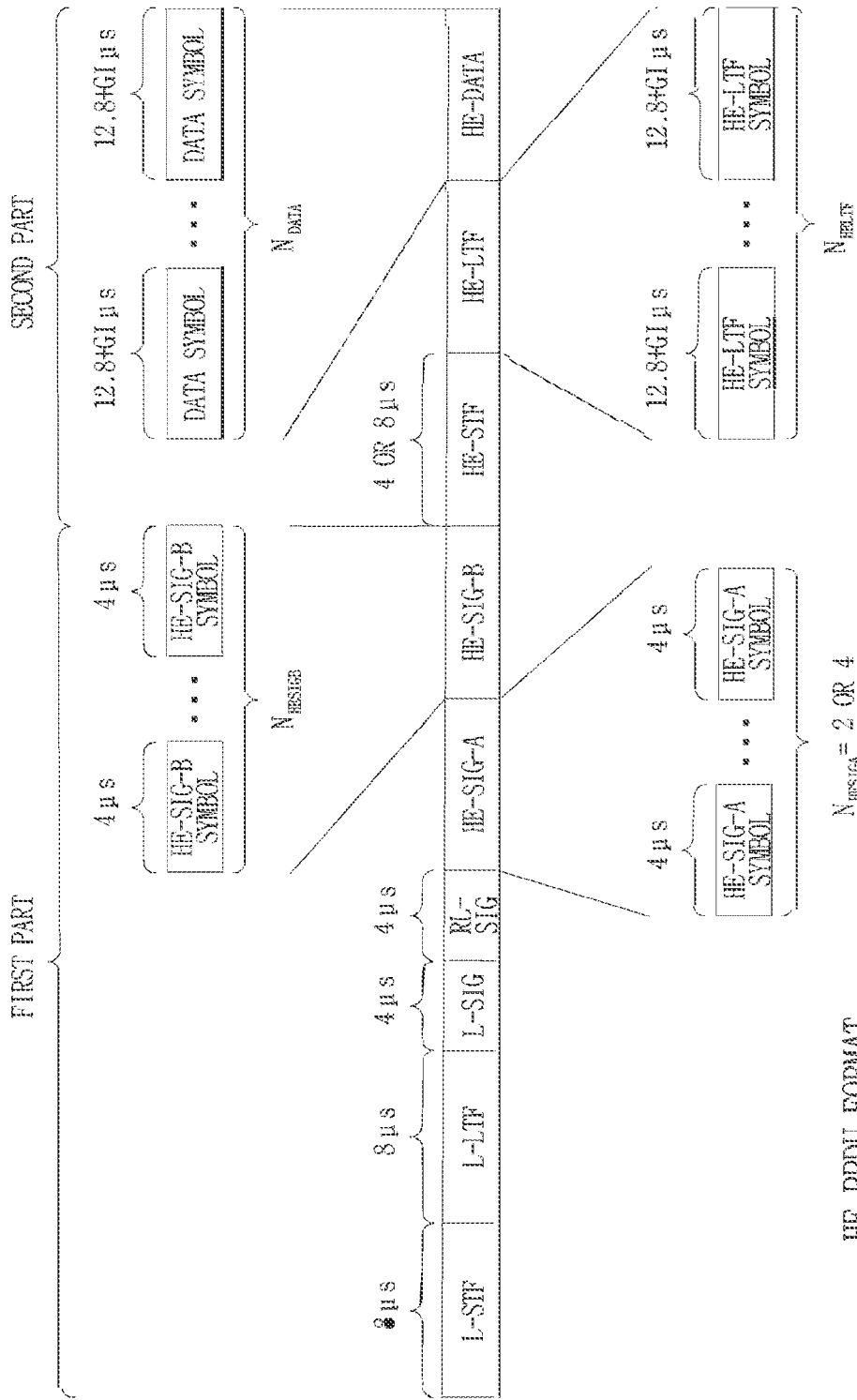
FIG. 7 depicts an exemplary HE PPDU frame format.

FIG. 7 depicts an exemplary HE PPDU frame format. A transmitting STA may generate a PPDU frame according to the HE PPDU frame format as illustrated in FIG. 7 and transmit the PPDU frame to a receiving STA. The receiving STA may receive, detect, and process the PPDU.

The HE PPDU frame format may broadly include two parts: the first part including an L-STF field, an L-LTF field, an L-SIG field, a repeated L-SIG (RL-SIG) field, a HE-SIG-A field, and a HE-SIG-B field and the second part including a HE-STF field, a HE-LTF field, and a HE-DATA field. 64-FFT based on a channel bandwidth of 20 MHz may be applied to the first part and a basic subcarrier spacing of 312.5 kHz and a basic DFT period of 3.2 μs may be included in the first part. 256-FFT based on a channel bandwidth of 20 MHz may be applied to the second part and a basic subcarrier spacing of 75.125 kHz and a basic DFT period of 12.8 μs may be included in the second part.

The HE-SIG-A field may include $N_{HESIGA}$ symbols, the HE-SIG-B field may include $N_{HESIGB}$ symbols, the HE-LTF field may include $N_{HELTF}$ symbols, and the HE-DATA field may include $N_{DATA}$ symbols. A detailed description of the fields included in the HE PPDU frame format is given in Table 1.

TABLE I

| Element | Definition | Duration | DFT Period | GI | Subcarrier Spacing | Description |
|---|---|---|---|---|---|---|
| Legacy (L)-STF | Non-high throughput (HT) Short Training Field | 8 us | — | — | 1.250 kHz | Equivalent to L-STF of a non-trigger-based PPDU has a periodicity of 0.8 us with 10 periods. |
| L-LTF | Non-HT Long Training Field | 8 us | 3.2 us | 1.6 us | 312.5 kHz | |
| L-SIG | Non-HT SIGNAL Field | 4 us | 3.2 us | 0.8 us | 312.5 kHz | |
| RL-SIG | Repeated Non-HT SIGNAL Field | 4 us | 3.2 us | 0.8 us | 312.5 kHz | |
| HE-SIG-A | HE SIGNAL A Field | $N_{HESIGA}$* 4 us | 3.2 us | 0.8 us | 312.5 kHz | HE-SIG-A is duplicated on each 20 MHz segment after the legacy preamble to indicate HE common control information. $N_{HESIGA}$ means the number of OFDM symbols of the HE-SIG-A field and is equal to 2 or 4. |

TABLE I-continued

| Element | Definition | Duration | DFT Period | GI | Subcarrier Spacing | Description |
|---------|------------|----------|------------|-----|---------------------|-------------|
| HE-SIG-B | HE SIGNAL B Field | $N_{HESIGB}$ * 4 us | 3.2 us | 0.8 us | 312.5 kHz | $N_{HESIGB}$ means the number of OFDM symbols of the HE-SIG-B field and is variable. DL MU packet contains HE-SIG-B. Single user (SU) packets and UL Trigger-based packets do not contain HE-SIG-B. |
| HE-STF | HE Short Training Field | 4 or 8 us | — | — | Non-trigger-based PPDU: (equivalent to) 1,250 kHz; Trigger-based PPDU: (equivalent to) 625 kHz | HE-STF of a non-trigger-based PPDU has a periodicity of 0.8 us with 5 periods. A non-trigger-based PPDU is not sent in response to a trigger frame. The HE-STF of a trigger-based PPDU has a periodicity of 1.6 us with 5 periods. A trigger-based PPDU is an UL PPDU sent in response to a trigger frame. |
| HE-LTF | HE Long Training Field | $N_{HELTF}$ * (DTF period + GI) us | 2xLTF: 6.4 us 4xLTF: 12.8 us | Supports 0.8, 1.6, 3.2 us | 2xLTF: (equivalent to) 156.25 kHz; 4xLTF: 78.125 kHz | HE PPDU may support 2xLTF mode and 4xLTF mode. In the 2xLTF mode, HE-LTF symbol excluding GI is equivalent to modulating every other tone in an OFDM symbol of 12.8 us excluding GI, and then removing the second half of the OFDM symbol in the time domain. $N_{HELTF}$ means the number of HE-LTF symbols and is equal to 1, 2, 4, 6, 8. |
| HE-DATA | HE DATA Field | $N_{DATA}$ * (DTF period + GI) us | 12.8 us | Supports 0.8, 1.6, 3.2 us | 78.125 kHz | $N_{DATA}$ means the number of HE data symbols |

L-STF is a non-HT Short Training field and may have a duration of 8 μs and a subcarrier spacing equivalent to 1250 kHz. L-STF of a PPDU which is not based on a trigger may have a periodicity of 0.8 μs with 10 periods. Herein, the trigger corresponds to scheduling information for UL transmission. L-LTF is a non-HT Long Training field and may have a duration of 8 μs, a DFT period of 3.2 μs, a Guard Interval (GI) of 1.6 μs, and a subcarrier spacing of 312.5 kHz.

L-SIG is a non-HT signal field and may have a duration of 4 μs, a DFT period of to 3.2 μs, a GI of 0.8 μs, and a subcarrier spacing of 312.5 kHz. RL-SIG is a repeated Non-HT signal field and may have a duration of 4 μs, a DFT period of 3.2 μs, a GI of 0.8 μs, and a subcarrier spacing of 312.5 kHz. L-STF, L-LTF, L-SIG, and RL-SIG may be called legacy preambles.

HE-SIG-A is a HE signal A field and may have a duration of $N_{HESIGA}$*4 μs, a DFT period of 3.2 μs, a GI of 0.8 μs, and a subcarrier spacing of 312.5 kHz. RE-SIG-A may be duplicated on each 20 MHz segment after the legacy preambles to indicate common control information. $N_{HESIGA}$ represents the number of OFDM symbols of the HE-SIG-A field and may have a value of 2 or 4.

HE-SIG-B is a HE signal B field and may have a duration of $N_{HESIGB}$*4 μs, a DFT period of 3.2 μs, a GI of 0.8 μs, and a subcarrier spacing of 312.5 kHz. $N_{HESIGB}$ represents the number of OFDM symbols of the HE-SIG-B field and may have a variable value. In addition, although a DL Multi-User (MU) packet may include the HE-SIG-B field, a Single-User (SU) packet and a UL trigger-based packet may not include the HE-SIG-B field.

HE-STF is a HE Short Training field and may have a duration of 4 or 8 μs. A non trigger-based PPDU may have a subcarrier spacing equivalent to 1250 kHz and a trigger-based PPDU may have a subcarrier spacing equivalent to 625 kHz. HE-STF of the non-triggered PPDU may have a periodicity of 0.8 μs with 4 periods. The non-triggered PPDU is not transmitted in response to a trigger field. HE-STF of the trigger based PPDU may have a periodicity of 1.6 μs with 5 periods. The trigger based PPDU is a UL PPDU transmitted in response to the trigger frame.

HE-LTF is a HE Long Training field and may have a duration of $N_{HELTF}$*(DFT period+GI) μs. $N_{HELTF}$ represents the number of HE-LTF symbols and may have a value of 1, 2, 4, 6, or 8. A HE PPDU may support a 2xLTF mode and a 4xLTF mode. In the 2xLTF mode, a HE-LTF symbol except for a GI is equivalent to a symbol obtained by modulating every other tone in an OFDM symbol of 12.8 μs excluding a GI and then eliminating the first half or the second half of the OFDM symbol in the time domain. In the 4xLTF mode, a HE-LTF symbol excluding a GI are equivalent to a symbol obtained by modulating every fourth tone in an OFDM symbol of 12.8 μs excluding a GI and then eliminating the first three-fourths or the last three-fourths of the OFDM symbol in the time domain. 2xLTF may have a DFT period of 6.4 μs and 4xLTF may have a DFT period of 12.8 μs. A GI of HE-LTF may support 0.8 μs, 1.6 μs, and 3.2 μs. 2xLTF may have a subcarrier spacing equivalent to 156.25 kHz and 4xLTF may have a subcarrier spacing of 78.125 kHz.

HE-DATA is a HE data field and may have a duration of $N_{DATA}$*(DFT period+GI) $N_{DATA}$ represents the number of HE-DATA symbols. HE-DATA may have a DFT period of 12.8 μs. A GI of HE-DATA may support 0.8 μs, 1.6 μs, and 3.2 μs. HE-DATA may have a subcarrier spacing of 78.125 kHz.

The above description of the fields included in the HE PPDU frame format may be combined with exemplary HE PPDU frame formats described below. For example, characteristics of fields exemplarily described below may be applied while a transmission order of the fields of the HE PPDU frame format of FIG. 7 is maintained.

Figure 8:
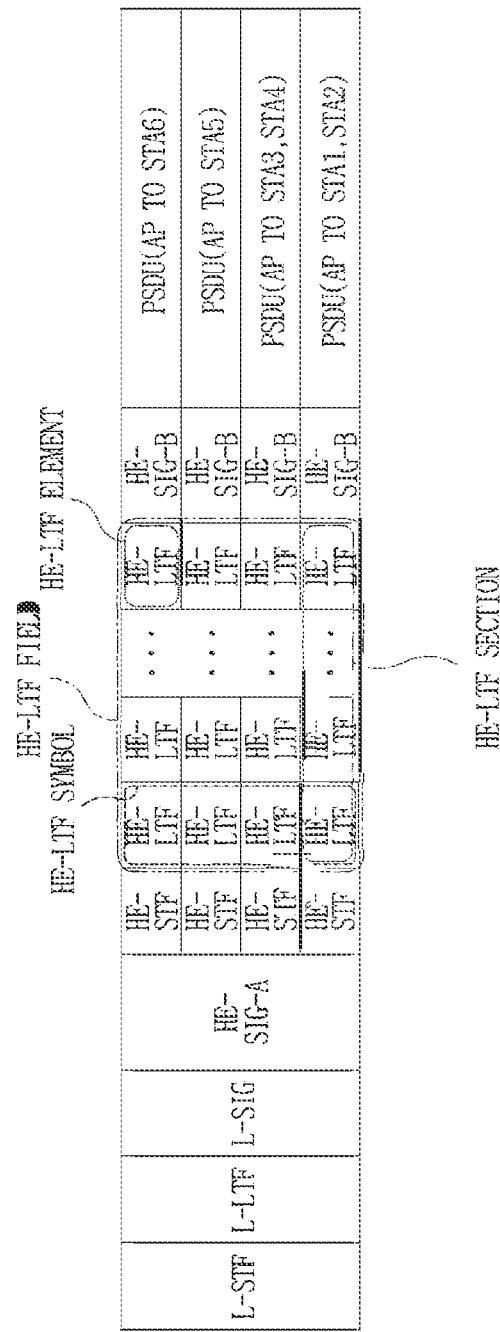
FIG. 8 depicts an exemplary High Efficiency (HE) Physical layer Protocol Data Unit (PPDU) frame format according to the present disclosure.

FIG. 8 depicts an exemplary HE PPDU frame format according to the present disclosure. Referring to FIG. 8, the vertical axis represents frequency and the horizontal axis represents time. It is assumed that frequency and time increase in the upward direction and the right direction, respectively.

In the example of FIG. 8, one channel includes four subchannels. An L-STF, an L-LTF, an L-SIG, and a HE-SIG-A may be transmitted per channel (e.g., 20 MHz). A HE-STF and a HE-LTF may be transmitted on each basic subchannel unit (e.g., 5 MHz)), and a HE-SIG-B and a PSDU may be transmitted on each of the subchannels allocated to an STA. A subchannel allocated to an STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 8, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may also be referred to as Resource Unit (RU) or subband. In particular, terms like OFDMA subchannel, OFDMA RU, OFDMA subband can be used as synonyms for OFDMA in the present disclosure. Terms like a bandwidth of a subchannel, a number of tones (or subcarriers) allocated to a subchannel, a number of data tones (or data sub carriers) allocated to a subchannel can be used to express a size of a subchannel. A subchannel refers to a frequency band allocated to an STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 8, a plurality of HE-LTF elements are distinguished in the time and frequency domains. One HE-LTF element may correspond to one OFDM symbol in time domain and one subchannel unit (i.e., a subchannel bandwidth allocated to an STA) in frequency domain. The HE-LTF elements are logical units, and the PHY layer does not necessarily operate in units of a HE-LTF element. In the following description, a HE-LTF element may be referred to shortly as an HE-LTF.

An HE-LTF symbol may correspond to a set of HE-LTF elements in one OFDM symbol in the time domain and in one channel unit (e.g., 20 MHz) in the frequency domain. An HE-LTF section may correspond to a set of HE-LTF elements in one or more OFDM symbols in time domain and in one subchannel unit (i.e., a subchannel bandwidth allocated to an STA) in frequency domain. An HE-LTF field may be a set of HE-LTF elements, HE-LTF symbols, or HE-LTF sections for a plurality of STAs. The L-STF field is used for frequency offset estimation and phase offset estimation, for preamble decoding at a legacy STA (i.e., an STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., a third-party STA is not allowed to transmit during a certain period based on the value of a LENGTH field included in the L-SIG field).

HE-SIG-A (or HEW SIG-A) represents High Efficiency Signal A (or High Efficiency WLAN Signal A) and includes HE PPDU (or HEW PPDU) modulation parameters, etc. for HE preamble (or HEW preamble) decoding at an HE STA (or HEW STA). The set of parameters included in the HEW SIG-A field may include one or more of Very High Throughput (VHT) PPDU modulation parameters transmitted by IEEE 802.11ac stations, as listed m Table II below, to ensure backward compatibility with legacy STAs (e.g., IEEE 802.11 ac stations).

Table II illustrates fields, bit positions, numbers of bits, and descriptions included in each of two parts, VHT-SIG-Al and VHT-SIG-A2, of the VHT-SIG-A field defined by the IEEE 802.11ac standard. For example, a BW (Band Width) field occupies two Least Significant Bits (LSBs), B0 and B1 of the VHT-SIG-Al field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification, which is hereby incorporated by reference. In the HE PPDU frame format of the present disclosure, the HE-SIG-A field may include one or more of the fields included in the VHT-SIG-A field, and it may provide backward compatibility with IEEE 802.11ac stations.

TABLE II

| Two parts of VHT-SIG-A | Bit | Field | Number of bits | Description |
| --- | --- | --- | --- | --- |
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |

TABLE II-continued

| Two parts of VHT-SIG-A | Bit | Field | Number of bits | Description |
|---|---|---|---|---|
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |

TABLE II-continued

| Two parts of VHT-SIG-A | Bit | Field | Number of bits | Description |
|---|---|---|---|---|
| | B8 | Beamformed | 1 | For a VHT SU PPDU:<br>Set to 1 if a Beamforming steering matrix is applied to the waveform in an SU transmission as described in 20.3.11.11.2, set to 0 otherwise.<br>For a VHT MU PPDU:<br>Reserved and set to 1<br>NOTE—If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

Figure 9:
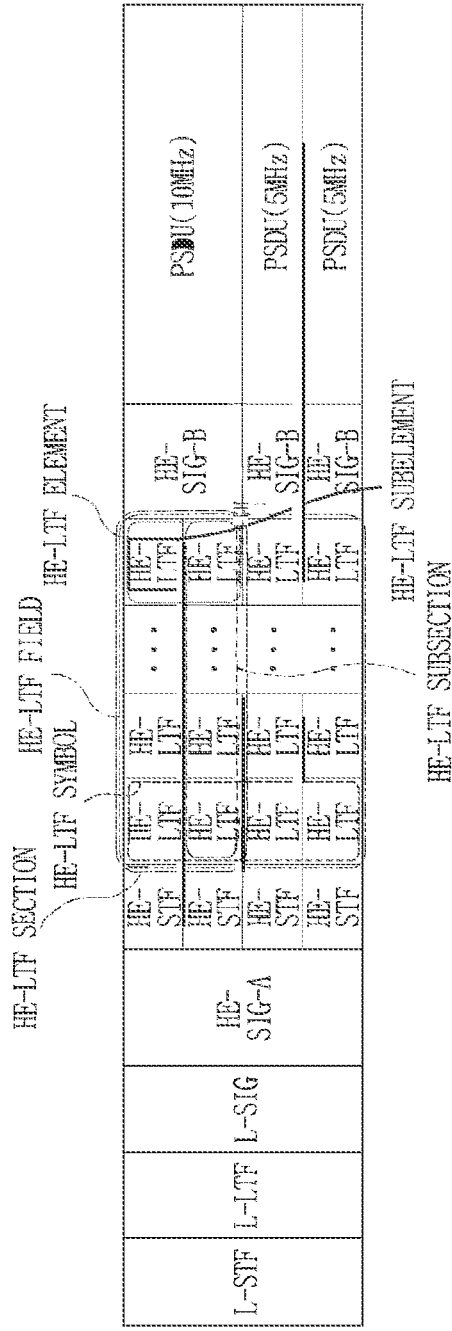
FIG. 9 depicts subchannel allocation in a HE PPDU frame format according to the present disclosure.

FIG. 9 depicts subchannel allocation in the HE PPDU frame format according to the present disclosure. In FIG. 9, it is assumed that information indicating subchannels allocated to STAs in HE PPDU indicates that the 0 MHz subchannel is allocated to STA1 (i.e., no subchannel is allocated), a 5-MHz subchannel is allocated to each of STA2 and STA3, and a 10-MHz subchannel is allocated to STA4.

In the example of FIG. 9, an L-STF, an L-LTF, an L-SIG, and an HE-SIG-A may be transmitted per channel (e.g., 20 MHz), a HE-STF and a HE-LTF may be transmitted on each basic subchannel unit (e.g., 5 MHz), and a HE-SIG-B and a PSDU may be transmitted on each of the subchannels allocated to STAs. A subchannel allocated to an STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 9, the size of a subchannel allocated to STA2 is equal to that of the basic subchannel unit, the size of a subchannel allocated to STA3 is equal to that of the basic subchannel unit, and the size of a subchannel allocated to STA4 is twice the size of the basic subchannel unit.

FIG. 9 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to an STA) in the frequency domain. One HE-LTF subelement may correspond to one OFDM symbol in the time domain and one basic subchannel unit (e.g. 5 MHz) in the frequency domain. In the example of FIG. 9, one HE-LTF element includes one HE-LTF subelement in the 5-MHz subchannel allocated to STA2 or STA3. On the other hand, one HE-LTF element includes two HE-LTF subelements in the third subchannel (i.e., 10-MHz subchannel, allocated to STA4). A HE-LTF element and a HE-LTF subelement are logical units and the PHY layer does not always operate in units of an HE-LTF element or an HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain. A HE-LTF section may correspond to a set of HE-LTF elements in one or more OFDM symbols in the time domain and one subchannel unit (i.e., the bandwidth of a subchannel allocated to an STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 9, one HE-LTF section includes one HE-LTF subsection in the 5-MHz subchannel allocated to STA2 or STA3. On the other hand, one HE-LTF section includes two HE-LTF subsections in the third subchannel (i.e., 10-MHz subchannel, allocated to STA4). An HE-LTF field may correspond to a set of HE-LTF elements (or subelements), HE-LTF symbols, or HE-LTF sections (or subsections) for a plurality of STAs.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 8, if one channel includes four subchannels, it may not be allowed to keep the third subchannel unallocated and empty, while the first, second, and fourth subchannels are allocated to STAs. However, the present disclosure does not exclude non-allocation of an intermediate subchannel of one channel to an STA.

Figure 10:
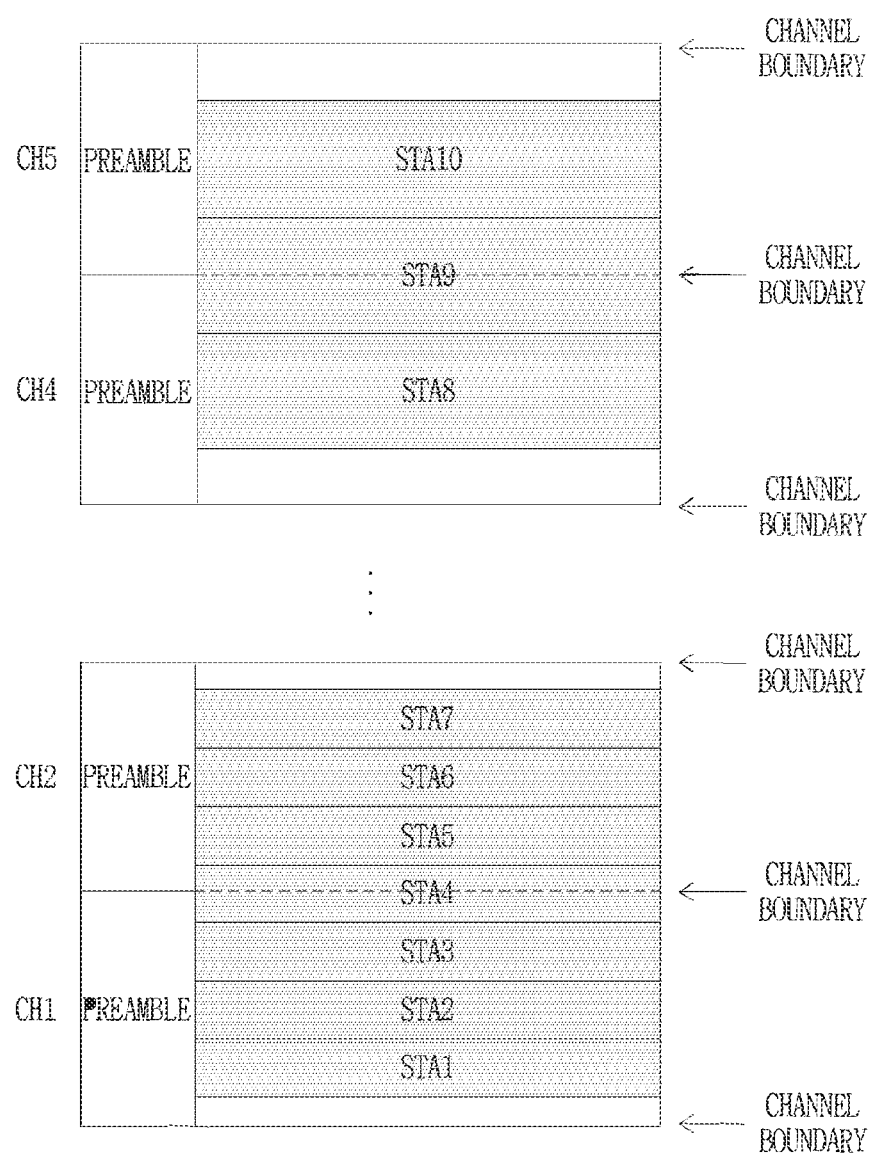
FIG. 10 depicts a subchannel allocation method according to the present disclosure.

FIG. 10 depicts a subchannel allocation method according to the present disclosure. In the example of FIG. 10, a plurality of contiguous channels (e.g., 20-MHz bandwidth channels) and boundaries of the plurality of contiguous channels are shown. In FIG. 10, a preamble may correspond to an L-STF, an L-LTF, an L-SIG, and a HE-SIG-A as illustrated in the examples of FIGS. 8 and 9.

A subchannel for each HE STA may be allocated within one channel and may not be allocated with partially overlapping between a plurality of channels. That is, if there are two contiguous 20-MHz channels CH1 and CH2, subchannels for STAs paired for MU-MIMO mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels. FIG. 10 is based on the assumption that subchannels each having the size of a basic subchannel unit (e.g., 5 MHz) in CH1 and CH2 are allocated to STA1 to STA7, and subchannels, each having double the size (e.g., 10 MHz) of the basic subchannel unit in CH4 and CH5, are allocated to STA5, STA9, and STA10.

As illustrated in the lower part of FIG. 10, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to two channels). In the foregoing example of the present disclosure, the subchannel allocation to STA4 is not allowed.

As illustrated in the upper part of FIG. 10, although a subchannel allocated to STA5 or STA10 is fully overlapped only with one channel (i.e., without crossing the channel boundary, or belonging only to one channel), a subchannel allocated to STA9 is partially overlapped with two channels (i.e., crossing the channel boundary, or belonging to two channels). In the foregoing example of the present disclosure, the subchannel allocation to STA9 is not allowed.

On the other hand, in some embodiments, it may be allowed to allocate a subchannel partially overlapped between a plurality of channels (i.e., crossing the channel boundary, or belonging to two or more channels). For example, in SU-MIMO mode transmission, a plurality of contiguous channels may be allocated to an STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present disclosure and thus should not be construed as limiting the present disclosure. For example, the bandwidths of a channel and a subchannel may be defined or allocated as values other than the above examples. In addition, a plurality of subchannels in one channel may have the same or different channel widths.

FIG. 11 depicts the starting and ending points of a HE-LTF field in the HE PPDU frame format according to the present disclosure. To support the MU-MIMO mode and the OFDMA mode, the HE PPDU frame format according to the present disclosure may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE-STAs may be provided in the HE-SIG-A or HE-SIG-B field, which will be described later in additional detail.

FIG. 11 is based on an assumption that a first 5-MHz subchannel is allocated to STA1 and STA2 and two spatial streams are transmitted to each STA in a DL or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are transmitted to support MU-MIMO transmission.

According to an example of the present disclosure, the relationship between a total number of spatial streams transmitted on one subchannel and a number of HE-LTFs is listed in Table III.

TABLE III

| Total number of spatial streams transmitted on one subchannel | Number of HE-LTFs |
|---|---|
| 1 | 1 |
| 2 | 2 |
| 3 | 4 |
| 4 | 4 |
| 5 | 6 |
| 6 | 6 |
| 7 | 8 |
| 8 | 8 |

Referring to Table III as an example, if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number that is 1 larger than the number of the spatial streams need to be transmitted.

Referring to FIG. 11 again, it is assumed that the second 5-MHz subchannel is allocated to STA3 and STA4 and one spatial stream per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 11, a HE-STF, a HE-LTF, a HE-LTF, a HE-LTF, a HE-LTF, and a HE-SIGB follow the HE-SIG-A field on the subchannel (i.e., four HE-LTFs are transmitted). This is for the purpose of setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby disrupting orthogonality (i.e., orthogonality is not maintained). To overcome this problem, an additional constraint needs to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the number of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the number of HE-LTF s (HE-LTF symbols or HE-LTF elements in a HE-LTF section) required according to the total number of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e., HE STAs) in MU-MIMO-mode or OFDMA-mode transmission. Or it may be said that the lengths of HE-LTF sections are equal on a plurality of subchannels for all users (i.e., HE STAs) in MU-MIMO-mode or OFDMA mode transmission. Or it may be said that the number of HE-LTF elements included in each HE-LTF section is equal on a plurality of subchannels for all users (i.e., HE STAs) in MU-MIMO mode or OFDMA mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 8) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to Table III). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K of spatial streams transmitted in a subchannel having a maximum number of spatial streams across a plurality of subchannels is an odd number greater than one, the number of HE-LTF symbols may be equal to K+1. When only one STA is allocated to one subchannel in OFDMA mode (i.e., OFDMA mode without using MU-MIMO), a subchannel having a maximum number of spatial streams across a plurality of subchannels may be determined by the number of spatial streams for an STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (where P is an integer equal to or larger than 1) HE-LTF symbols (refer to FIG. 8) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e., P) of another subchannel. Also, the number of HE-LTF elements (i.e., P) included in a HE-LTF section in one of the Q subchannels may be equal to the number of HE-LTF elements (i.e., P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or STAs).

Referring to FIG. 11 again, the third 5-MHz subchannel is allocated to STA5 and one spatial stream is transmitted on the subchannel in SU-MIMO (considering all sub channels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 11, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are not actually used for channel estimation at the STAs.

FIG. 12 depicts a HE-SIG-B field and a HE-SIG-C field in the HE PPDU frame format according to the present disclosure. To effectively support MU-MIMO-mode or OFDMA-mode transmission in the HE PPDU frame format according to the present disclosure, independent signaling information may be transmitted on each subchannel. Specifically, a different number of spatial streams may be transmitted to each of a plurality of HE STAs that receive an MU-MIMO mode or OFDMA mode transmission simultaneously. Therefore, information about the number of spatial streams to be transmitted should be indicated to each HE STA.

Information about the number of spatial streams on one channel may be included in, for example, an HE-SIG-A field. An HE-SIG-B field may include spatial stream allocation information about one subchannel. Also, an HE-SIG-C field may be transmitted after transmission of HE-LTFs, including Modulation and Coding Scheme (MCS) information about a PSDU and information about the length of the PSDU, etc.

Figure 13:
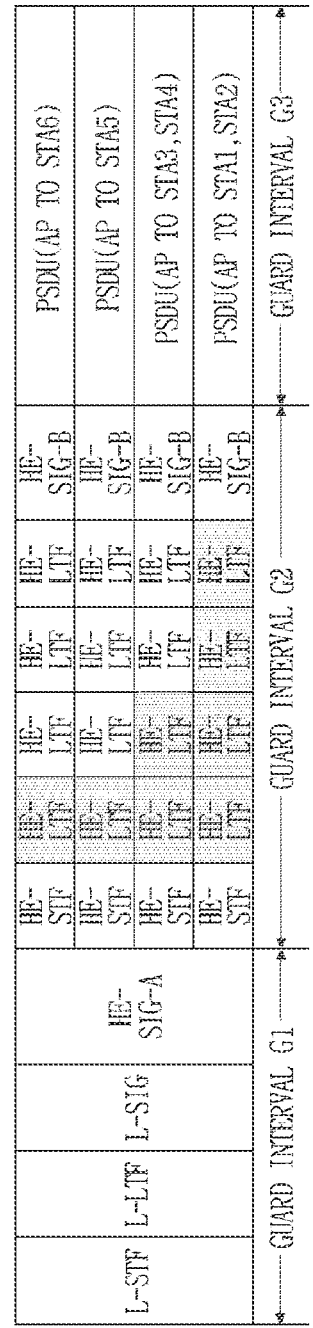
FIG. 13 depicts another example of a HE PPDU frame format according to the present disclosure.

FIG. 13 depicts OFDM symbol durations and GI lengths in the HE PPDU frame format according to the present disclosure. In the HE PPDU frame format according to the present disclosure, L-STF, L-LTF, L-SIG, and HE-SIG-A fields may be configured with 4.0-µs OFDM symbols based on 64-FFT. One OFDM symbol has a GI of 0.8 µs. In the present disclosure, a GI value applied to the L-STF, L-LTF, L-SIG, and HE-SIG-A fields is defined as G1. The L-STF, L-LTF, L-SIG, and HE-SIG-A fields may include 3.2-µs OFDM symbols based on 64-FFT, excluding the GIs. The term 64 FFT-based symbol is used mainly based on a channel bandwidth of 20 MHz. If the term 64 FFT-based symbol is used irrespective of a channel bandwidth, a 64 FFT-based symbol may mean a symbol having a symbol duration of 3.2 µs and a subcarrier spacing of 312.5 kHz.

The following HE-STF, HE-LTF, HE-SIG-B, and PSDU fields may include 16-µs OFDM symbols based on 256-FFT. The OFDM symbol duration may be changed according to a GI value. Two types of GI values may be defined for one OFDM symbol during different time periods. A GI value applied to the OFDM symbols of the HE-STF, HE-LTF, and HE-SIG-B fields is defined as G2 and a GI value applied to the OFDM symbols of the PSDU is defined as G3. Excluding the GIs, the HE-STF, HE-LTF, HE-SIG-B, and PSDU fields may be configured with 12.8-µs OFDM symbols based on 256-FFT. The term 256 FFT-based symbol is used mainly based on a channel bandwidth of 20 MHz. If the term 256 FFT-based symbol is used irrespective of a channel bandwidth, a 256 FFT-based symbol may mean a symbol having a symbol duration of 12.8 µs and a subcarrier spacing of 78.125 kHz.

The values of G2 and G3 may be equal or different. If G2 and G3 are equal, G2 and G3 may be defined as one parameter without distinguishing between G2 and G3. In one embodiment, unlike G1, G2 and G3 may vary according to a transmitted PPDU transmission vector, rather than being fixed values (i.e., predetermined values). This is because the lengths of the HE-STF, HE-LTF, and HE-SIG-B fields to which G2 is applied may vary according to a PPDU transmission vector and the length of the PSDU to which G3 is applied may also vary according to the PPDU transmission vector.

For example, G1 may have a fixed value (i.e., a predetermined value) of 0.8 µs, G2 may be a value selected from 3.2 µs, 1.6 µs, 0.8 µs, and 0.4 µs, and G3 may be a value selected from among 3.2 µs, 1.6 µs, 0.8 µs, and 0.4 µs. Also, G1 may have a fixed value (i.e., a predetermined value) of 0.8 µs, and G2 or G3 may be a value selected or determined from among 3.2 µs, 1.6 µs, 0.8 µs, and 0.4 µs. In one embodiment, G1 does not require separate signaling because G1 is a fixed value and signaling information indicating G2 and G3 may be provided to an HE STA in the HE-SIG-A field.

In one embodiment, G2 and G3 are applied commonly across all OFDM symbols transmitted during a corresponding time period and across all subchannels. Accordingly, PSDU transmission timings and OFDM symbol timings may be synchronized. For example, it may not be allowed to apply a 3.2-µs G2 value to a subchannel and a 1.6-µs or 0.8-µs G2 value to another subchannel during a specific time period. Rather, the same 3.2-µs G2 value may be applied to the subchannels during the same time period. In a similar example, it may not be allowed to apply a 1.6-µs G3 value to a subchannel and a 3.2-µs or 0.8-µs G3 value to another subchannel during a specific time period. Rather, the same 1.6-µs G3 value may be applied to the subchannels during the same time period.

In the case where an HE PPDU frame format having HE-LTF sections of different lengths for subchannels is used (i.e., in the case where the number of HE-LTFs is not determined for each subchannel based on the maximum of the number of HE-LTFs required according to the total number of spatial streams transmitted on each subchannel in a set of HE-STAs allocated to each of subchannels, as described in the example of FIG. 11), if the values of G2 and G3 are different, PSDUs are transmitted on different subchannels at different time points and OFDM symbol timings are not synchronized. Therefore, values of G2 and G3 may need to be selected or determined as a same value.

In the case where an HE PPDU frame format having HE-LTF sections of the same length for subchannels is used (i.e., in the case where the number of HE-LTFs is determined for each subchannel based on the maximum of the numbers of RE-LTF s required according to the total number of spatial streams transmitted on each subchannel in a set of HE STAs allocated to each of subchannels, as described in the example of FIG. 11), even though the values of G2 and G3 are different, PSDUs are transmitted on the subchannels at the same time point, without causing discrepancy between OFDM symbol timings. Therefore, values of G2 and G3 may be selected or determined as different values. However, even in this case, the present disclosure does not exclude that values of G2 and G3 may be selected or determined as a same value. In the example of FIG. 13, OFDM symbol durations S1, S2, and S3 may be applied respectively to time periods to which the GIs G1, G2, and G3 are applied.

Figure 14:
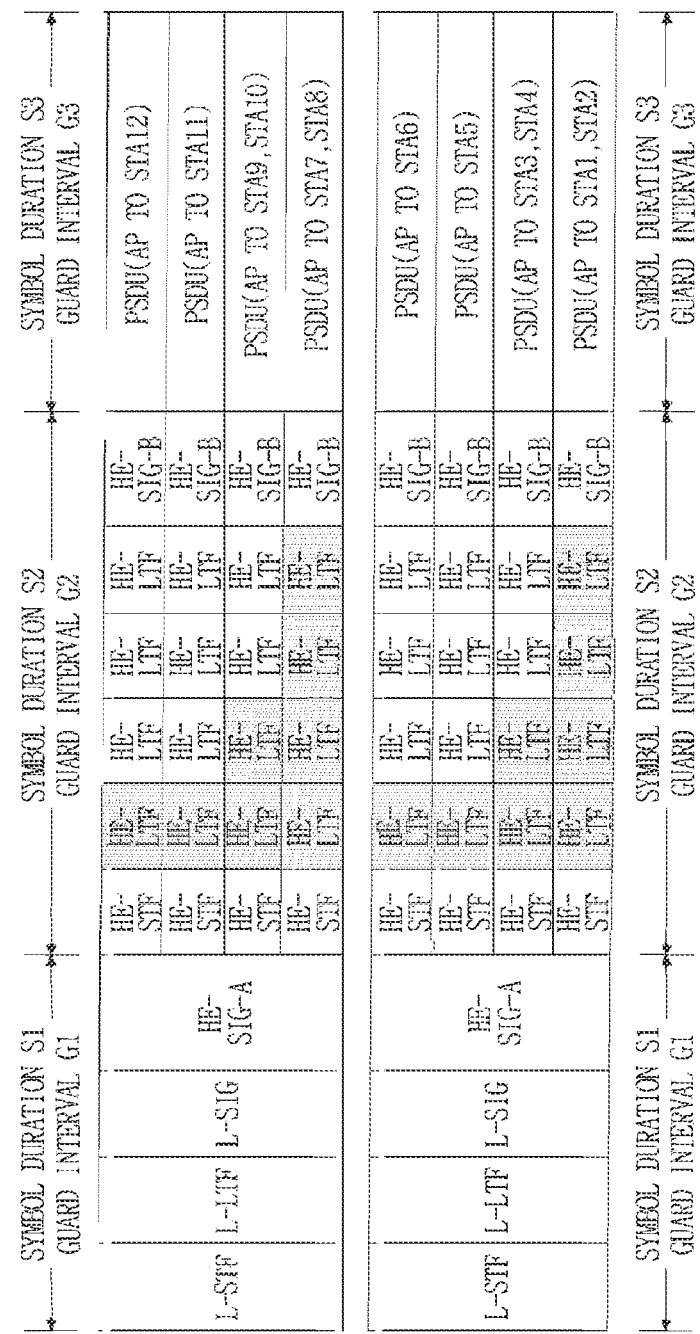
FIG. 14 depicts an exemplary HE PPDU frame format for a wide channel band according to the present disclosure.

FIG. 14 depicts an exemplary HE PPDU frame format for a wide channel band according to the present disclosure. Referring to FIG. 14, the HE PPDU frame format for one 20-MHz channel illustrated in the example of FIG. 13 is extended to two 20-MHz channels. Similarly, HE PPDU frame formats for the channel bandwidths of 80 MHz and 160 MHz may be configured by extending the HE PPDU frame format for one 20-MHz channel illustrated in the example of FIG. 13 to four and eight 20-MHz channels, respectively.

There is no modification involved in extending the HE PPDU frame format for one 20-MHz channel. In other words, all subchannels across one or more 20-MHz channels are the same in terms of PSDU transmission time points, OFDM symbol durations, and GIs. From this viewpoint, the example described with reference to FIG. 11 in which "the lengths of HE-LTF sections across subchannels are equal" may be extended to simultaneous application on a channel basis as well as on a subchannel basis. Therefore, PSDU transmission timings and OFDM symbol timings are synchronized for users paired for MU-MIMO mode or OFDMA mode transmission, thus maintaining orthogonality. This channel-based example will be described below.

Basically, in SU-MIMO mode or non-OFDMA mode transmission, it is sufficient to transmit as many HE-LTFs as required. However, the timings of fields transmitted on subchannels for other paired STAs need to be synchronized (or aligned) across all subchannels over one or more 20-MHz channels in MU-MIMO mode or OFDMA mode transmission. Therefore, the numbers of HE-LTFs on all other subchannels over one or more 20-MHz channels may be determined based on a subchannel having a maximum number of streams among all subchannels over one or more 20-MHz channels in MU-MIMO mode or OFDMA mode transmission.

Specifically, the number of HE-LTFs to be transmitted on all subchannels may be determined according to the maximum of the number of HE-LTFs required according to the total numbers of spatial streams transmitted on each subchannel over one or more 20-MHz channels, for a set of HE STAs allocated to each of the subchannels. Herein, 'the set of HE STAs allocated to each of the subchannels over one or more 20-MHz channels' is one HE STA in the SU-MIMO mode, whereas it is a set of a plurality of HE STAs paired on all subchannels over one or more 20-MHz channels in the MU-MIMO mode or OFDMA mode. The 'total number of spatial streams transmitted on each of all subchannels over one or more 20-MHz channels' is the number of spatial streams transmitted to one HE STA in the SU-MIMO mode and the number of spatial streams transmitted to a plurality of HE STAs paired on the subchannel in the MU-MIMO mode or OFDMA mode.

That is, it may be said that a HE-LTF field starts at the same time point and ends at the same time point on all subchannels over one or more 20-MHz channels for all users (i.e., HE STAs) in MU-MIMO mode or OFDMA mode transmission of a HE PPDU. Or it may be said that the lengths of HE-LTF sections are equal on all subchannels over one or more 20-MHz channels for all HE STAs in MU-MIMO mode or OFDMA mode transmission. Or it may be said that the number of HE-LTF elements included in each HE-LTF section is equal in all subchannels over one or more 20-MHz channels for all HE STAs in MU-MIMO mode or OFDMA mode transmission. Accordingly, PSDU transmission timings may be synchronized between all subchannels over one or more 20-MHz channels for all HE STAs in MU-MIMO mode or OFDMA mode transmission.

In FIG. 14, the OFDM symbol duration and GI of L-STF, L-LTF, L-SIG, and HE-SIG-A fields on the first 20-MHz channel are S1 and G1, respectively. Like the first 20-MHz channel, the second 20-MHz channel has S1 and G1 respectively as the OFDM symbol duration and GI of L-STF, L-LTF, L-SIG, and HE-SIG-A fields.

In FIG. 14, the OFDM symbol duration and GI of a HE-STF field, a plurality of HE-LTFs, and a HE-SIG-B field on the first 20-MHz channel are S2 and G2, respectively. Like the first 20-MHz channel, the OFDM symbol duration and GI of a HE-STF field, a plurality of HE-LTFs, and an HE-SIG-B field on the second 20-MHz channel are also S2 and G2, respectively.

In FIG. 14, the OFDM symbol duration and GI of a PSDU on the first 20-MHz channel are S3 and G3, respectively. Like the first 20-MHz channel, the OFDM symbol duration and GI of a PSDU on the second 20-MHz channel are also S3 and G3, respectively. This example it is shown that if the OFDM symbol duration and GI of one 20-MHz channel are determined based on 64-FFT, the OFDM symbol duration and GI of the other 20-MHz channel(s) should be determined based on 64-FFT. In other words, if the OFDM symbol duration and GI of one 20-MHz channel are determined based on 64-FFT, the OFDM symbol duration and GI of the other 20-MHz channel(s) should not be determined based on 256-FFT.

In a modified example, although subchannels within one 20-MHz channel may have the same OFDM symbol durations and the same GIs, subchannels within another 20-MHz channel may have different OFDM symbol durations and GIs. For example, while S2, G2, S3, and G3 are applied as OFDM symbol durations and GIs for subchannels within the first 20-MHz channel, different values (e.g., S4, G4, S5, and GS) may be applied as OFDM symbol durations and GIs for subchannels within the second 20-MHz channel. Even in this case, the OFDM symbol duration and GI, S1 and G1, applied to L-STF, L-LTF, and L-SIG fields in a different 20-MHz channel may be the same fixed values in every 20-MHz channel. Further, this modified example may include application of the example described before with reference to FIG. 11 in which 'subchannels have the same HE-LTF section length' only to subchannels within one 20-MHz channel, not to the HE-LTF section length of subchannels in another 20-MHz channel.

With reference to the foregoing examples of the present disclosure, mainly the features of a HE PPDU frame structure applicable to a DL MU-MIMO-mode or OFDMA mode transmission that an AP transmits simultaneously to a plurality of STAs has been described. Now, a description will be given of the features of a HE PPDU frame structure applicable to a UL MU-MIMO mode or OFDMA mode transmission that a plurality of STAs transmit simultaneously to an AP.

The above-described various examples of structures of the HE PPDU frame format supporting MU-MIMO mode or OFDMA mode transmission should not be understood as applicable only to DL without being applicable to UL. Rather, the examples should be understood as also applicable to UL. For example, the above-described exemplary HE PPDU frame formats may also be used for a UL HE PPDU transmission that a plurality of STAs simultaneously transmit to a single AP.

However, in the case of a DL MU-MIMO mode or OFDMA mode HE PPDU transmission that an AP simultaneously transmits to a plurality of STAs, the transmission entity, AP has knowledge of the number of spatial streams transmitted to an HE STA allocated to each of a plurality of subchannels. Therefore, the AP may include, in an HE-SIG-A field or a HE-SIG-B field, information about the total number of spatial streams transmitted across a channel, a maximum number of spatial streams (i.e., information being a basis of the number of HE-LTF elements (or the starting point and ending point of an HE-LTF section) on each subchannel), and the number of spatial streams transmitted on each subchannel. In contrast, in the case of a UL MU-MIMO mode or OFDMA mode HE PPDU transmission that a plurality of STAs simultaneously transmit to an AP, each STA being a transmission entity may only be aware of the number of spatial streams in an HE PSDU that it will transmit, without knowledge of the number of spatial streams in an HE PSDU transmitted by another STA paired with the STA. Accordingly, the STA may determine neither the total number of spatial streams transmitted across a channel nor a maximum number of spatial streams. To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO mode or OFDMA mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO mode or OFDMA mode transmission. As a consequence, an HE PPDU frame format applicable to a UL MU-MIMO or OFDMA mode may be configured without modification to an exemplary HE PPDU frame format applied to a DL MU-MIMO or OFDMA mode. For example, each STA may configure an HE PPDU frame format by including information about the number of spatial streams across a channel in an HE-SIG-A field, determining the number of HE-LTF elements (or the starting point and ending point of an HE-LTE section) on each subchannel according to the maximum number of spatial streams, and including information about the number of spatial streams for the individual STA in a HE-SIG-B field.

Alternatively, if the STAs operate according to the common/individual parameters received in the trigger frame from the AP, each STA does not need to indicate the common/individual parameters to the AP during a HE PPDU transmission. Therefore, this information may not be included in a HE PPDU. For example, each STA may determine the total number of spatial streams, the maximum number of spatial streams, and the number of spatial streams allocated to individual STA, as indicated by the AP, and configure an HE PPDU according to the determined numbers, without including information about the total number of spatial streams or the number of spatial streams allocated to the STA in the HE PPDU. On the other hand, if the AP does not provide common/individual parameters in a trigger frame, for a UL MIMO mode or OFDMA mode HE PPDU transmission, the following operation may be performed.

Common transmission parameters (e.g., channel Bandwidth (BW) information, etc.) for simultaneously transmitted HE PSDUs may be included in an HE-SIG-A field, but parameters that may be different for individual STAs (e.g., the number of spatial streams, an MCS, and whether STBC is used or not, for each individual STA) may not be included in the HE-SIG-A field. Although the individual parameters may be included in an HE-SIG-B field, information about the number of spatial streams and information indicating whether STBC is used or not, need to be transmitted before an HE-LTF field because the number of spatial streams and the information indicating whether STBC is used or not are significant to determination of configuration information about a preamble and a PSDU in an HE PPDU frame format (e.g., the number of HE-LTF elements is determined according to a combination of the number of spatial streams and the information indicating whether STBC is used or not). For this purpose, an HE PPDU frame format as illustrated in FIG. may be used for a UL HE PPDU transmission.

FIG. 15 depicts another exemplary HE PPDU frame format according to the present disclosure. The HE PPDU frame format illustrated in FIG. 15 is characterized in that a structure of HE-SIG-A, HE-SIG-B, and HE-SIG-C fields similar to that in FIG. 12 is used for a UL PPDU transmission. As described before, if a UL MU-MIMO mode or OFDMA mode transmission is performed by triggering of an AP (according to common/individual parameters provided by the AP), an individual STA may not need to report an individual parameter to the AP. In this case, one or more of an HE-SIG-B field, an HE-SIG-C field, and a first HE-LTF element (i.e., an HE-LTF between an HE-STF field and an HE-SIG-B field) illustrated in FIG. 15 may not be present. In this case, a description of each field given below may be applicable only in the presence of the field.

In the example of FIG. 15, an HE-SIG-A field is transmitted per channel (i.e., per 20-MHz channel) and may include transmission parameters common to simultaneously transmitted HE PSDUs. Since the same information is transmitted in the fields from the L-STF to HE-SIG-A in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similar to DL MU-MIMO mode or OFDMA mode in HE PPDU transmission, if transmission of PSDUs start at different time points on subchannels in UL mode or OFDMA mode HE PPDU transmission, and if OFDM symbols are not aligned accordingly, then the implementation complexity of an AP that receives a plurality of PSDUs is increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 11.

This feature may mean that the HE-LTF field start at the same time point and end at the same time point across all users (i.e., HE STAs) in UL MU-MIMO mode or OFDMA mode transmission. Or it may be said that the HE-LTF sections of a plurality of subchannels have the same length across all HE STAs in UL MU-MIMO mode or OFDMA mode transmission. Or it may be said that each of the HE-LTF sections of a plurality of subchannels includes the same number of HE-LTF elements across all HE STAs in UL MU-MIMO mode or OFDMA mode transmission. Therefore, PSDU transmission timings are synchronized between a plurality of subchannels across all HE STAs in UL MU-MIMO mode or OFDMA mode transmission.

In the HE PPDU frame format supporting UL MIMO mode or OFDMA mode transmission illustrated in FIG. 15, the L-STF, L-LTF, L-SIG, and HE-SIG-A fields may include 4.0-µs OFDM symbols based on 64-FFT. One OFDM symbol has a GI of 0.8 µs. In the present description, a GI value applied to the L-STF, L-LTF, L-SIG, and HE-SIG-A fields is defined as GI. Excluding the GI, the L-STF, L-LTF, L-SIG, and HE-SIG-A fields may be configured as 3.2-µs OFDM symbols based on 64-FFT.

In the example of FIG. 15, an HE-STF field, an HE-LTF field, an HE-SIG-B field, HE-LTF elements(s) in a HE-LTF section, an HE-SIG-C field and a PSDU may include 16-µs OFDM symbols based on 256-FFT. The OFDM symbol duration may be changed according to a GI value. Two types of GI values may be defined for one OFDM symbol for different time periods. A GI value applied to the OFDM symbols of the HE-STF field, the HE-LTF field, the HE-SIG-B field, the HE-LTF elements(s) in the HE-LTF section, and the HE-SIG-C field is defined as G2 and a GI value applied to the OFDM symbols of the PSDU is defined as G3. Excluding the GIs, the HE-STF field, the HE-LTF field, the HE-SIG-B field, and the PSDU may include 12.8-μs OFDM symbols based on 256-FFT.

The values of G2 and G3 may be equal or different. If G2 and G3 are equal, G2 and G3 may be defined as one parameter without distinguishing G2 from G3. In one embodiment, unlike GI, G2 and G3 may vary according to each transmitted PPDU transmission vector, rather than being fixed values (i.e. predetermined values known to both a transmitter and a receiver). This is because the lengths of the HE-STF, the HE-LTF, the HE-SIG-B, the HE-LTF element(s) in a HE-LTF section, and the HE-SIG-C to which G2 is applied may vary according to a PPDU transmission vector and the length of the PSDU to which G3 is applied may also vary according to the PPDU transmission vector.

In another example, the GI applied to the L-STF, L-LTF, L-SIG, and HE-SIG-A fields (to which 64-FFT is applied) may be a fixed value (i.e., a predefined value known to both a transmitter and a receiver) and one of G2 and G3 (if G2 and G3 are equal, they may be defined as one parameter) applied to the following fields (i.e., the HE-STF, HE-LTF, HE-SIG-B, HE-SIG-C, and PSDU to which 256-FFT is applied) may be configured or indicated as a variable value (e.g., one of 3.2 μs, 1.6 μs, 0.8 μs, and 0.4 μs).

More specifically, GI may have a fixed value (i.e. a predefined value known to both a transmitter and a receiver) of 0.8 μs, G2 may be a value selected or indicated from among 3.2 μs, 1.6 μs, 0.8 μs, and 0.4 μs, and G3 may be a value selected or indicated from among 3.2 μs, 1.6 μs, 0.8 μs, and 0.4 μs. Also, GI may be a fixed value (i.e., a predefined value known to both a transmitter and a receiver) of 0.8 μs, and G2 or G3 may be a value selected or indicated from among 3.2 μs, 1.6 μs, 0.8 μs, and 0.4 μs. GI does not require signaling because GI is a fixed value, and signaling information indicating G2 and G3 may be provided to the AP. If a HE STA performs UL transmission according to triggering of the AP (or based on parameters provided by the AP), the HE-STA does not need to indicate the value of G2 or G3 to the AP.

G2 and G3 are applied commonly across all OFDM symbols transmitted during a corresponding time period and across all subchannels. Accordingly, PSDU transmission timings may be synchronized, and OFDM symbol timings may be synchronized. For example, it is not allowed that a 3.2-μs G2 value is applied to a subchannel during a specific time period, while a 1.6-μs or 0.8-μs G2 value is applied to other subchannels during the same time period. Rather, the same 3.2-μs G2 value may be applied to other subchannels during the same time period. In a similar example, it is not allowed that a 1.6-μs G3 value is applied to a subchannel during a specific time period, while a 3.2-μs or 0.8-μs G3 value is applied to other subchannels during the same time period. Rather, the same 1.6-μs G3 value may be applied to other subchannels during the same time period.

In the case where a HE PPDU frame format having HE-LTF sections of different lengths for subchannels is used (i.e., in the case where 'the number of HE-LTFs is not determined for each subchannel based on the maximum of the numbers of HE-LTFs required according to the total numbers of spatial streams transmitted on subchannels in a set of HE STAs allocated to each of the subchannels'), if the values of G2 and G3 are different, a PSDU is transmitted on each subchannel at a different time point and OFDM symbol timings are not synchronized. Therefore, the same values for G2 and G3 may need to be selected or indicated in this case.

In the case where a HE PPDU frame format having HE-LTF sections of the same length for subchannels is used (i.e., in the case where 'the number of HE-LTFs is determined for each subchannel based on the maximum of the numbers of HE-LTFs required according to the total numbers of spatial streams transmitted on subchannels in a set of HE STAs allocated to each of the subchannels'), even though the values of G2 and G3 are different, PSDUs are transmitted on the subchannels at the same time point, without causing discrepancy between OFDM symbol timings. Therefore, selection or indication of different values for G2 and G3 does not cause a problem. However, even in this case, selection or indication of the same values for G2 and G3 is not excluded.

In the example of FIG. 15, OFDM symbol durations S1, S2, and S3 may be applied respectively to time periods to which the GIs G1, G2, and G3 are applied. As described before, a plurality of STAs may simultaneously transmit PSDUs in an HE PPDU frame format on their allocated subchannels or on their allocated spatial streams to an AP (i.e., referred to as UL MU-MIMO or OFDMA transmission or "UL MU transmission") and may simultaneously receive PSDUs in the HE PPDU frame format on their allocated subchannels on their allocated spatial streams from the AP (i.e., referred to as DL MU-MIMO or OFDMA transmission or "DL MU transmission").

Figure 16:
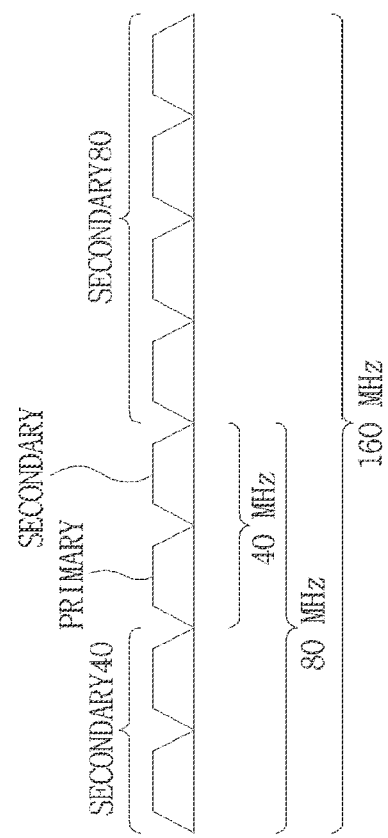
FIGS. 16 and 17 depict operating channels in a WLAN system.
Figure 17:
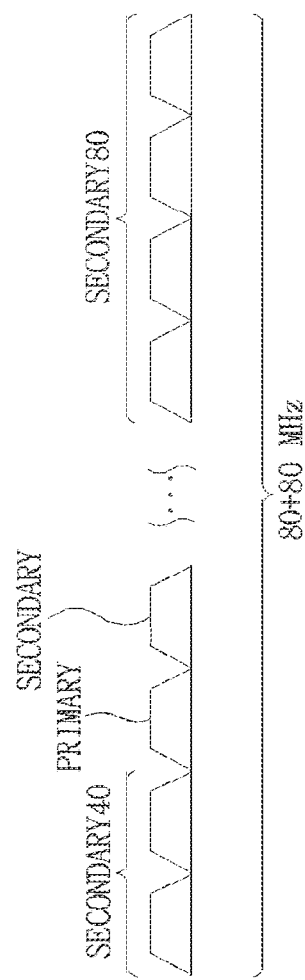

FIGS. 16 and 17 depict operating channels in a WLAN system. Basically, the WLAN system may support a single channel having a bandwidth of 20 MHz as a BSS operating channel. The WLAN system may also support a BSS operating channel having a bandwidth of 40 MHz, 80 MHz, or 160 MHz by bonding a plurality of contiguous 20-MHz channels (refer to FIG. 16). Further, the WLAN system may support a BSS operating channel having a bandwidth of 160 MHz including non-contiguous 80-MHz channels (called a bandwidth of 80+80 MHz) (refer to FIG. 17).

As illustrated in FIG. 16, one 40-MHz channel may include a primary 20-MHz channel and a secondary 20-MHz channel which are contiguous. One 80-MHz channel may include a primary 40-MHz channel and a secondary 40-MHz channel which are contiguous. One 160-MHz channel may include a primary 80-MHz channel and a secondary 80-MHz channel which are contiguous. As illustrated in FIG. 17, one 80+80-MHz channel may include a primary 80-MHz channel and a secondary 80-MHz channel which are non-contiguous. A primary channel is defined as a common channel for all STAs within a BSS. The primary channel may be used for transmission of a basic signal such as a beacon. The primary channel may also be a basic channel used for transmission of a data unit (e.g., a PPDU). If a STA uses a channel width larger than the channel width of the primary channel, for data transmission, the STA may use another channel within a corresponding channel, in addition to the primary channel. This additional channel is referred to as a secondary channel.

A STA according to an Enhanced Distributed Channel Access (EDCA) scheme may determine a transmission bandwidth (or a transmission channel width) as follows. Upon generation of a transmission frame, a STA (e.g., an AP or a non-AP STA) may perform a backoff procedure on a primary channel to acquire a Transmission Opportunity (TXOP). For this purpose, the STA may sense the primary channel during a DIFS or AIFS[i]. If the primary channel is idle, the STA may attempt to transmit the frame. The STA may select a random backoff count, wait for a slot time corresponding to the selected random backoff count, and then attempt to transmit the frame. The random backoff count may be determined to be a value ranging from 0 to CW (CW is a value of a contention window parameter).

When the random backoff procedure starts, the STA may activate a back-off timer according to the determined backoff count and decrement the backoff count by 1 each time. If the medium of the corresponding channel is monitored as busy, the STA discontinues the countdown and waits. If the medium is idle, the STA resumes the countdown. If the backoff timer reaches 0, the STA may determine a transmission bandwidth by checking whether the secondary channel is idle or busy at the corresponding time point.

For example, the STA may monitor a channel idle state during a predetermined IFS (e.g., DIFS or AIFS[i]) on the primary channel) and determine a transmission start timing on the primary channel by the random backoff procedure. If the secondary channel is idle during a PIFS shortly before the determined transmission start timing of the primary channel, the STA may transmit a frame on the primary channel and the secondary channel.

As described above, when the backoff timer reaches 0 for the primary channel, the STA may transmit an X-MHz mask PPDU (e.g., where X is 20, 40, 80, or 160) on channels including an idle secondary channel(s) according to the CCA result of the secondary channel(s).

The X-MHz mask PPDU is a PPDU for which a TXVECTOR parameter, CH_BANDWIDTH, is set to CBW X. That is, if the X-MHz mask PPDU can be transmitted, this means that a PPDU satisfying a spectrum mask for X-MHz transmission can be transmitted. The X-MHz mask PPDU may include a PPDU transmitted in a bandwidth equal to or smaller than X MHz.

For example, if an 80-MHz mask PPDU can be transmitted, this means that a PPDU having a channel width of 80 MHz or a PPDU having a channel width smaller than 80 MHz (e.g., 40 MHz, 20 MHz, etc.) can be transmitted within a Power Spectral Density (PSD) limit of a spectrum mask for 80-MHz transmission.

As described before, if a STA is allowed to start a TXOP and has at least one MAC Service Data Unit (MSDU) to be transmitted under the Access Category (AC) of the TXOP allowed for the STA, the STA may perform one of the following a), b), c), d), or e) (in the following description, FIGS. 16 and 17 may be referred to for a primary channel (i.e., a primary 20-MHz channel) a secondary channel (i.e., a secondary 20-MHz channel), a secondary 40-MHz channel, and a secondary 80-MHz channel):

a) If the secondary channel, the secondary 40-MHz channel, and the secondary 80-MHz channel are idle during a PIFS shortly before the start of the TXOP, a 160-MHz or 80+80 MHz mask PPDU may be transmitted.
b) If both the secondary channel and the secondary 40-MHz channel are idle during the PIFS shortly before the start of the TXOP, an 80-MHz mask PPDU may be transmitted on a primary 80-MHz channel.
c) If the secondary channel is idle during the PIFS shortly before the start of the TXOP, a 40-MHz mask PPDU may be transmitted on a primary 40-MHz channel.
d) A 20-MHz mask PPDU may be transmitted on the primary 20-MHz channel.
e) A channel access attempt may be resumed by performing a backoff procedure as in the case where the medium is indicated as busy on the primary channel by one of physical carrier sensing and virtual carrier sensing and a backoff timer has a value of 0.

Now, a description will be given of the features of TXOP limits applicable to UL MU transmissions. A TXOP is an interval of time during which a particular Quality-of-Service (QoS) STA has the right to initiate frame exchange sequences onto the wireless medium. A TXOP holder (or a TXOP owner) is a QoS STA that has either been granted a TXOP by the hybrid coordinator (HC) or successfully contended for a TXOP. A TXOP responder is a STA that transmits a frame in response to a frame received from a TXOP holder (or a TXOP owner) during a frame exchange sequence, but that does not acquire a TXOP in the process.

Under Hybrid Coordination Function (HCF), the basic unit of allocation of the right to transmit onto the wireless medium is the TXOP. Each TXOP is defined by a starting time and a maximum duration (or maximum length). Here, HCF is a coordination function that combines and enhances aspects of the contention based and contention free access methods to provide QoS STAs with prioritized and parameterized QoS access to the wireless medium, while continuing to support non-QoS STAs for best-effort transfer. The HCF includes the functionality provided by both Enhanced Distributed Channel Access (EDCA) and HCF-Controlled Channel Access (HCCA). EDCA is the prioritized Carrier Sense Multiple Access with Collision Avoidance (CSMA/CA) access mechanism used by QoS STAs in a QoS BSS and STAs operating outside the context of a BSS. This access mechanism is also used by the QoS AP and operates concurrently with HCCA.

The duration of a TXOP is the time a STA obtaining a TXOP (i.e., a TXOP holder) maintains uninterrupted control of the medium. The duration of a TXOP includes the time required to transmit frames sent as an immediate response to TXOP holder transmissions.

Within a TXOP, a STA may transmit packets separated by SIFS without contending for the wireless medium for transmitting every packet. To increase the efficiency for channel access, such as preventing a STA from maintaining the TXOP too long, a limitation may be applied to the duration of TXOP. Accordingly, the TXOP holder may ensure that the duration of a TXOP does not exceed the TXOP limit.

The TXOP limits may be provided or configured by an AP. For example, an AP may advertise TXOP Limit field in EDCA Parameter Set element in Beacon and Probe Response frames transmitted by the AP, and the value of a TXOP limit may be specified as an unsigned integer, in units of 32 μs.

In case of UL MU transmissions, a TXOP holder may be an HE AP and TXOP responders may be HE STAs. For example, an HE AP may obtain a TXOP to transmit a UL trigger frame, and HE STAs may transmit UL MU PPDU in response to the UL trigger frame within the duration of TXOP. In addition, the HE AP may transmit acknowledgement (e.g., MU Block Ack frame) to the HE STAs.

The UL trigger frame may be an UL MU-MIMO Poll frame when the followup UL MU PPDU includes UL MU-MIMO transmission, or an UL OFDMA Poll frame when the followup UL MU PPDU includes UL OFDMA transmission. The UL trigger frame may include sufficient information to identify the STAs transmitting the UL MU PPDUs and information allocating resources for the UL MU PPDUs. For example, the UL trigger frame may include UL MU PPDU Duration information (or a value of the L-SIG Length of the UL MU PPDU) that indicates the duration of the followup UL MU PPDU transmission.

For UL MU transmissions, an HE AP (i.e., the TXOP holder) should ensure that the duration of a TXOP does not exceed the TXOP limit. For example, the HE AP may or may not transmit an UL trigger frame based on whether the time required for a frame exchange sequence exceeds the TXOP limit or not. Alternatively or additionally, the HE AP may adjust the UL MU PPDU Duration information to meet the TXOP limit.

According to a first TXOP limitation example, a TXOP holder (e.g., an HE AP) may not transmit an UL trigger frame, when the time required for the transmission of the UL MU PPDUs plus a SIFS exceeds the TXOP limit. In other words, the TXOP holder may not initiate a frame exchange sequence of an UL trigger and an UL MU PPDU (i.e., not including a control response frame) exceeding the TXOP limit. Such constraints may be applied to setting a value of the UL MU PPDU Duration information of the UL trigger frame. That is, the UL MU PPDU Duration information, which indicates the time required for the transmission of the UL MU PPDUs, may have a value not exceeding the TXOP limit.

According to a second TXOP limitation example, a TXOP holder (e.g., an HE AP) may not transmit an UL trigger frame, when the time required for the transmission of the UL MU PPDUs and the associated MU Block Ack frame plus two SIFSs exceeds the TXOP limit. In other words, the TXOP holder may not initiate a frame exchange sequence of an UL trigger, an UL MU PPDU and a MU Block Ack frame (i.e., including a control response frame) exceeding the TXOP limit. Such constraints may be applied to setting a value of the UL MU PPDU Duration field of the UL trigger frame. That is, the UL MU PPDU Duration field, which indicates the time required for the transmission of the UL MU PPDUs and the associated MU Block Ack frame plus two SIFSs, may have a value not exceeding the TXOP limit. A TXOP limit value may be configured for Access Category (AC) and PHY characteristics. By way of example and without any limitation, for OFDM/HTNHT PHYs, a TXOP limit for AC_Video (AC_VI) may be given as 4.096 ms which is longer than a TXOP limit 2.528 ms for AC_Best effort (AC_BE), AC_Background (AC_BK), or AC_Voice (AC_VO).

A TXOP limit may have value of zero (0). When a TXOP limit has value of 0, a PPDU satisfying a special condition may be transmitted within the current TXOP. An MU PPDU (e.g., DL MU PPDU or UL MU PPDU) carrying a single data unit or A-MPDU related to multiple users may be transmitted within the current TXOP when a TXOP limit has value of 0. For example, a TXOP limit of 0 indicates that the TXOP holder may transmit or cause to be transmitted (e.g., as responses) one of PPDU(s) indicated as following 1), 2), 3) and 4) at any rate, within the current TXOP.
1) One or more Single-User (SU) PPDUs carrying fragments of a single MAC Service Data Unit (MSDU) or MAC Management Protocol Data Unit (MMPDU).
2) An SU PPDU or a VHT MU PPDU or an HE MU PPDU carrying a single MSDU, a single MMPDU, a single Aggregate-MSDU (A-MSDU) or a single Aggregate MPDU (A-MPDU).
3) A VHT MU PPDU carrying A-MPDUs to different users (a single A-MPDU to each user) or an HE MU PPDU carrying A-MPDUs to/from different users (a single A-MPDU to/from each user).
4) A QoS Null frame or PS-Poll frame.

A TXOP holder may be required to set a duration of a TXOP within a TXOP limit. However, a TXOP holder may set a duration of a TXOP exceeding a TXOP limit for exceptional cases. For example, a TXOP holder may exceed the TXOP limit if it does not transmit more than one Data or Management frame in the TXOP, and for the case indicated as following 5), 6), 7), 8), 9), 10), 11), 12) and 13). Otherwise, a TXOP holder may not exceed the TXOP limit.

5) Retransmission of an MPDU, not in an A-MPDU consisting of more than one MPDU.
6) Initial transmission of an MSDU under a block ack agreement, where the MSDU is not in an A-MPDU consisting of more than one MPDU and the MSDU is not in an A-MSDU.
7) Transmission of a Control MPDU (including an uplink multi-user Control MPDU) or a QoS Null MPDU, not in an A-MPDU consisting of more than one MPDU.
8) Initial transmission of a fragment of an MSDU or MMPDU, if a previous fragment of that MSDU or MMPDU was retransmitted.
9) Transmission of a fragment of an MSDU or MMPDU fragmented into 16 fragments.
10) Transmission of an A-MPDU consisting of the initial transmission of a single MPDU not containing an MSDU and that is not an individually addressed Management frame.
11) Transmission of a group addressed MPDU, not in an A-MPDU consisting of more than one MPDU,
12) Transmission of a Null Data Packet (NDP)
13) Transmission of a VHT NDP Announcement frame and NDP or transmission of a Beamforming Report Poll frame, where these fit within the TXOP limit and it is only the response and the immediately preceding SIFS cause the TXOP limit to be exceeded.

According to the present disclosure, a TXOP for a frame exchange sequence including UL MU data transmission may have a duration exceeding a TXOP limit for exceptional cases. For example, a TXOP holder may exceed a TXOP limit when the TXOP holder does not transmit more than a control response frame after exceeding the TXOP limit. In other words, a TXOP holder may set a duration of a TXOP exceeding a TXOP limit when only a control response frame exceeds a TXOP limit.

Figure 18:
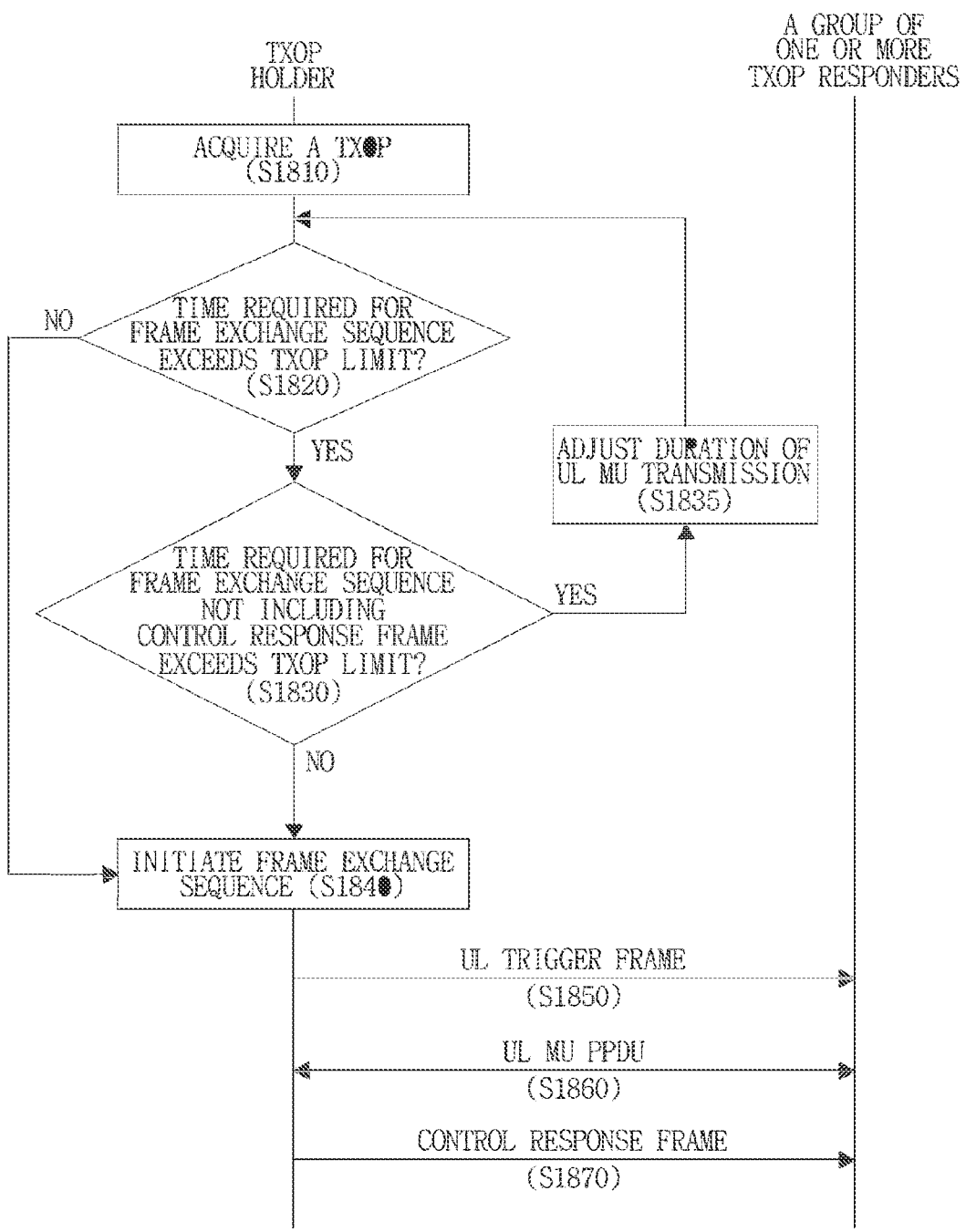
FIG. 18 depicts an exemplary operation of TXOP limits for UL MU transmissions according to the present disclosure.

FIG. 18 depicts an exemplary operation of TXOP limits for UL MU transmissions according to the present disclosure.

In step S1810, a STA may acquire a TXOP for initiating a frame exchange sequence including UL MU transmission, for example, UL MU data transmission from a group of one or more TXOP responders. An STA that has acquired or granted a TXOP becomes a TXOP holder as depicted in FIG. 18. A TXOP holder may be an HE AP and a group of one or more TXOP responders may be a group of one or more STAs.

In step S1820, the TXOP holder may determine if a time required for a frame exchange sequence including UL MU transmission exceeds a TXOP limit. For example, the TXOP holder may determine if a time required for a frame exchange sequence including an UL trigger, an UL MU transmission and a control response frame exceeds a TXOP limit. In other words, the TXOP holder may determine if the time required for the transmission of the UL MU PPDU and the associated MU Block Ack frame plus two SIFSs exceeds the TXOP limit.

If the time required for the frame exchange sequence does not exceed the TXOP limit, the TXOP holder may determine that the frame exchange sequence is valid and may initiate the frame exchange sequence in step S1840.

If the time required for the frame exchange sequence exceeds the TXOP limit, the TXOP holder may determine if a time required for a frame exchange sequence not including a control response frame exceeds a TXOP limit in step S1830. For example, the TXOP holder may determine if a time required for a frame exchange sequence including an UL trigger and an UL MU transmission exceeds a TXOP limit. In other words, the TXOP holder may determine if the time required for the transmission of the UL MU PPDU plus a SIFS exceeds the TXOP limit.

If the time required for the frame exchange sequence not including a control response frame does not exceed the TXOP limit, the TXOP holder may determine that the frame exchange sequence is valid and may initiate the frame exchange sequence in step S1840.

If the time required for the frame exchange sequence not including a control response frame exceeds the TXOP limit, the TXOP holder may determine that the frame exchange sequence is not valid and may adjust a duration of UL MU transmission to meet the TXOP limit in step S1835. For example, the TXOP holder may adjust a value of UL MU PPDU Duration field included in the UL trigger frame, to make the time required for transmission of the UL trigger frame and the UL MU PPDU does not exceed the TXOP limit. Alternatively, step S1835 may be omitted and the TXOP holder may not initiate the frame exchange sequence if it is determined as invalid.

In step S1840, the TXOP holder may initiate the frame exchange sequence. For example, the TXOP holder may transmit the UL trigger frame to a group of one or more TXOP responders in step S1850.

According to the UL trigger frame, the group of one or more TXOP responders may transmit a UL MU PPDU (e.g., UL MU data transmission). Here, the TXOP limit may indicate a time on or after the UL MU PPDU transmission (S1860).

In response to the UL MU PPDU, the TXOP holder may transmit a control response frame (e.g., MU Block Ack frame) to the group of one or more TXOP responders in step S1870. In the exemplary operation of FIG. 18, step S1820 may be omitted according to the first TXOP limitation example, or step S1830 may be omitted according to the second TXOP limitation example as described above.

Figure 19:
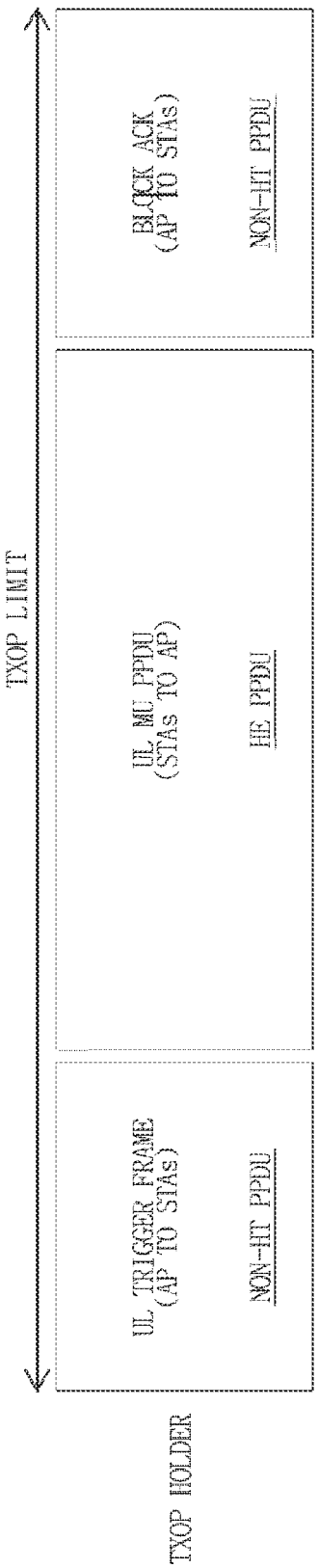
FIG. 19 depicts an exemplary frame exchange sequence with TXOP limits for UL MU transmissions according to the present disclosure.

FIG. 19 depicts an exemplary frame exchange sequence with TXOP limits for UL MU transmissions according to the present disclosure. In the example of FIG. 19, the frame exchange sequence of a UL trigger frame (e.g., an UL MU-MIMO Poll frame, or a UL OFDMA Poll frame), a UL MU PPDU (e.g., a UL MU PPDU including UL transmissions or UL OFDMA transmissions), and a Block ACK frame does not exceed the TXOP limit.

According to the first TXOP limitation example, the TXOP holder may determine if the frame exchange sequence of a UL trigger and a UL MU PPDU (i.e., not including a control response frame) exceeds the TXOP limit. In other words, the TXOP holder may determine if the time required for the transmission of the UL MU PPDU plus a SIFS exceeds the TXOP limit. In the example of FIG. 19, the frame exchange sequence of a UL trigger and a UL MU PPDU does not exceed the TXOP limit, or the time required for the transmission of the UL MU PPDU plus a SIFS does not exceed the TXOP limit. Accordingly, the frame exchange sequence of FIG. 19 is valid under TXOP limits for UL MU transmissions, and the TXOP holder may transmit the UL trigger frame to start the frame exchange sequence.

According to the second TXOP limitation example, the TXOP holder may determine if the frame exchange sequence of a UL trigger, a UL MU PPDU and an MU Block Ack frame (i.e., including a control response frame) exceeds the TXOP limit. In other words, the TXOP holder may determine if the time required for the transmission of the UL MU PPDU and the associated MU Block Ack frame plus two SIFSs exceeds the TXOP limit. In the example of FIG. 19, the frame exchange sequence of a UL trigger, a UL MU PPDU, and an MU Block Ack frame does not exceed the TXOP limit, or the time required for the transmission of the UL MU PPDU and the associated MU Block Ack frame plus two SIFSs does not exceed the TXOP limit. Accordingly, the frame exchange sequence of FIG. 19 is valid under TXOP limits for UL MU transmissions, and the TXOP holder may transmit the UL trigger frame to start the frame exchange sequence.

Figure 20:
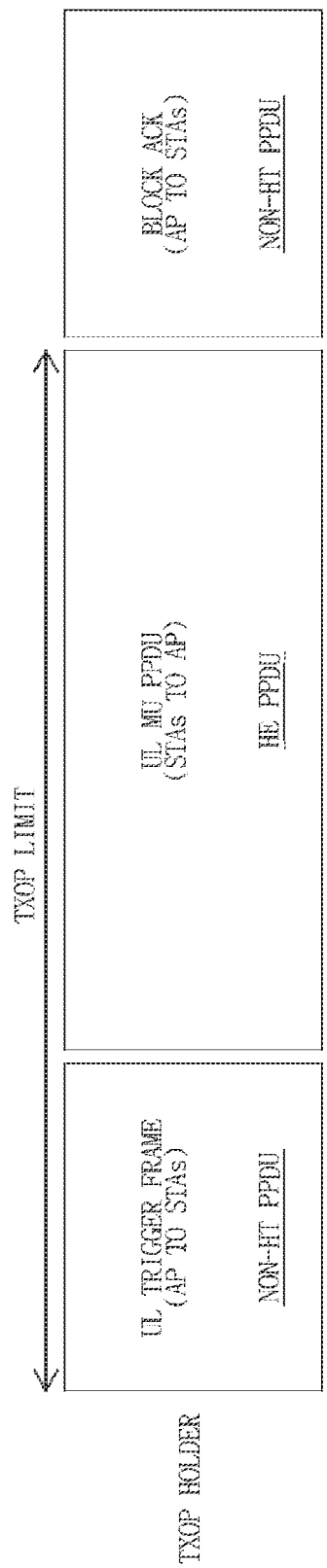
FIG. 20 depicts another exemplary frame exchange sequence with TXOP limits for UL MU transmissions according to the present disclosure.

FIG. 20 depicts another exemplary frame exchange sequence with TXOP limits for UL MU transmissions according to the present disclosure. In the example of FIG. 20, the frame exchange sequence of a UL trigger frame (e.g., a UL MU-MIMO Poll frame, or a UL OFDMA Poll frame), a UL MU PPDU (e.g., a UL MU PPDU including UL MU-MIMO transmissions or UL OFDMA transmissions), and a Block ACK frame exceeds the TXOP limit. More specifically, the frame exchange sequence of the UL trigger and the UL MU PPDU (i.e., not including a control response frame) does not exceed the TXOP limit, but the frame exchange sequence of the UL trigger, the UL MU PPDU, and the MU Block Ack frame (i.e., including a control response frame) exceeds the TXOP limit.

According to the first TXOP limitation example, the TXOP holder may determine if the frame exchange sequence of a UL trigger and a UL MU PPDU (i.e., not including a control response frame) exceeds the TXOP limit. In other words, the TXOP holder may determine if the time required for the transmission of the UL MU PPDU plus a SIFS exceeds the TXOP limit.

In the example of FIG. 20, the frame exchange sequence of a UL trigger and a UL MU PPDU does not exceed the TXOP limit, or the time required for the transmission of the UL MU PPDU plus a SIFS does not exceed the TXOP limit. Accordingly, the frame exchange sequence of FIG. 20 is valid, so long as the TXOP holder transmits only a control frame after exceeding a TXOP limit. More specifically, even though the frame exchange sequence including a control response frame exceeds the TXOP limit, the frame exchange sequence is valid when what exceeding the TXOP limit is only a control response frame.

According to the second TXOP limitation example, the TXOP holder may determine if the frame exchange sequence of a UL trigger, a UL MU PPDU and an MU Block Ack frame (i.e., including a control response frame) exceeds the TXOP limit. In other words, the TXOP holder may determine if the time required for the transmission of the UL MU PPDU and the associated MU Block Ack frame plus two SIFSs exceeds the TXOP limit.

In the example of FIG. 20, the frame exchange sequence of a UL trigger, a UL MU PPDU, and an MU Block Ack frame exceeds the TXOP limit, or the time required for the transmission of the UL MU PPDU and the associated MU Block Ack frame plus two SIFSs exceeds the TXOP limit. Accordingly, if the frame exchange sequence of FIG. 20 is not valid under TXOP limits for UL MU transmissions, the TXOP holder may not transmit the UL trigger frame or may adjust a value of the UL MU PPDU Duration information (or a value of the L-SIG Length of the UL MU PPDU) included in the UL trigger frame to meet the TXOP limit.

Figure 21:
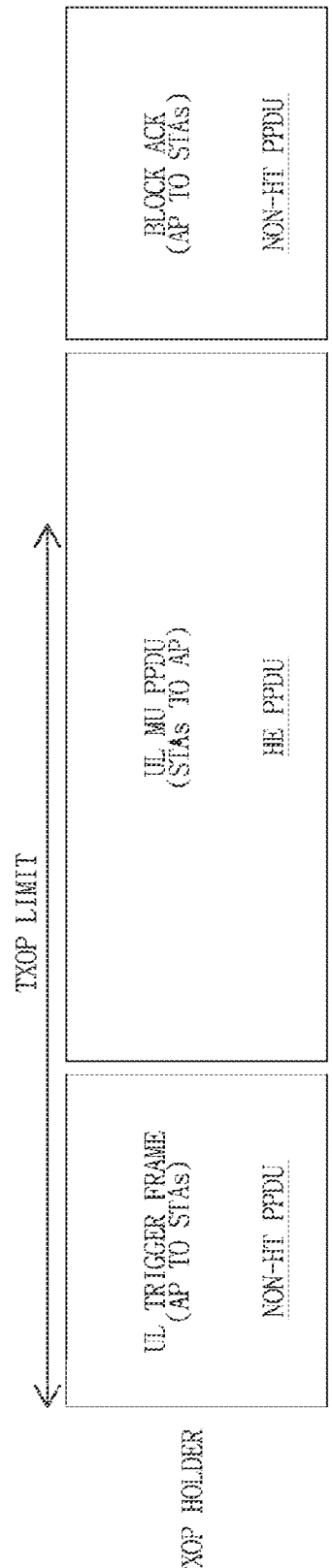
FIG. 21 depicts another exemplary frame exchange sequence with TXOP limits for UL MU transmissions according to the present disclosure.

FIG. 21 depicts another exemplary frame exchange sequence with TXOP limits for UL MU transmissions according to the present disclosure. In the example of FIG. 21, the frame exchange sequence of a UL trigger frame (e.g., a UL MU-MIMO Poll frame or a UL OFDMA Poll frame), a UL MU PPDU (e.g., a UL MU PPDU including UL transmissions or UL OFDMA transmissions), and a Block ACK frame exceeds the TXOP limit. More specifically, the frame exchange sequence of the UL trigger and the UL MU PPDU exceeds the TXOP limit.

According to the first TXOP limitation example, the TXOP holder may determine if the frame exchange sequence of a UL trigger and a UL MU PPDU (i.e., not including a control response frame) exceeds the TXOP limit. In other words, the TXOP holder may determine if the time required for the transmission of the UL MU PPDU plus a SIFS exceeds the TXOP limit.

In the example of FIG. 21, the frame exchange sequence of a UL trigger and a UL MU PPDU exceeds the TXOP limit, or the time required for the transmission of the UL MU PPDU plus a SIFS exceeds the TXOP limit. Accordingly, if the frame exchange sequence of FIG. 21 is not valid under TXOP limits for UL MU transmissions, the TXOP holder may not transmit the UL trigger frame or may adjust a value of the UL MU PPDU Duration information (or a value of the L-SIG Length of the UL MU PPDU) included in the UL trigger frame to meet the TXOP limit. More specifically, the frame exchange sequence is not valid when more than a control response frame exceeds the TXOP limit.

According to the second TXOP limitation example, the TXOP holder may determine if the frame exchange sequence of a UL trigger, a UL MU PPDU and an MU Block Ack frame (i.e., including a control response frame) exceeds the TXOP limit. In other words, the TXOP holder may determine if the time required for the transmission of the UL MU PPDU and the associated MU Block Ack frame plus two SIFSs exceeds the TXOP limit.

In the example of FIG. 21, the frame exchange sequence of a UL trigger, a UL MU PPDU, and an MU Block Ack frame exceeds the TXOP limit or the time required for the transmission of the UL MU PPDU and the associated MU Block Ack frame plus two SIFSs exceeds the TXOP limit. Accordingly, the frame exchange sequence of FIG. 21 is not valid under TXOP limits for UL MU transmissions, the TXOP holder may not transmit the UL trigger frame or may adjust a value of the UL MU PPDU Duration information (or a value of the L-SIG Length of the UL MU PPDU) included in the UL trigger frame to meet the TXOP limit.

Figure 22:
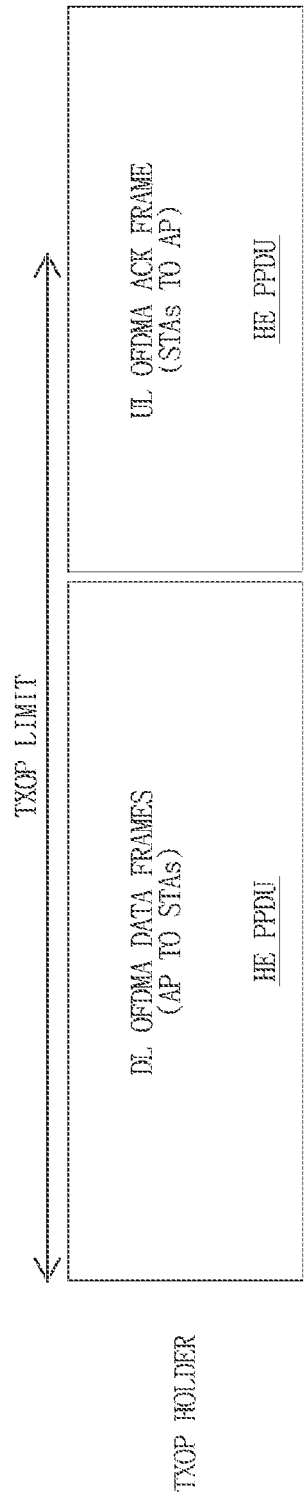
FIG. 22 depicts another exemplary frame exchange sequence with TXOP limits for UL MU transmissions according to the present disclosure.

FIG. 22 depicts another exemplary frame exchange sequence with TXOP limits for UL MU transmissions according to the present disclosure. In the example of FIG. 22, the frame exchange sequence of a DL MU PPDU (e.g., an HE PPDU including DL OFDMA Data frames) and a UL MU PPDU (e.g., an HE PPDU including UL OFDMA ACK frame) exceeds the TXOP limit. More specifically, the DL MU PPDU does not exceed the TXOP limit, but the frame exchange sequence of the DL MU PPDU and the UL MU PPDU which is a control response frame exceeds the TXOP limit. Here, the DL MU Data frame may correspond to or include an UL trigger frame in that it elicits immediate UL control response frame transmission.

For a frame exchange sequence including UL MU ACK transmission, the TXOP holder may determine if a DL MU PPDU (i.e., not including a control response frame) exceeds the TXOP limit. In the example of FIG. 22, a DL MU PPDU does not exceed the TXOP limit. Accordingly, the frame exchange sequence of FIG. 22 is valid. More specifically, even though the frame exchange sequence including a control response frame exceeds the TXOP limit, the frame exchange sequence is valid when exceeding the TXOP limit is only a control response frame. Now, a description will be given of the features of backoff operations applicable to UL MU transmissions.

Figure 23:
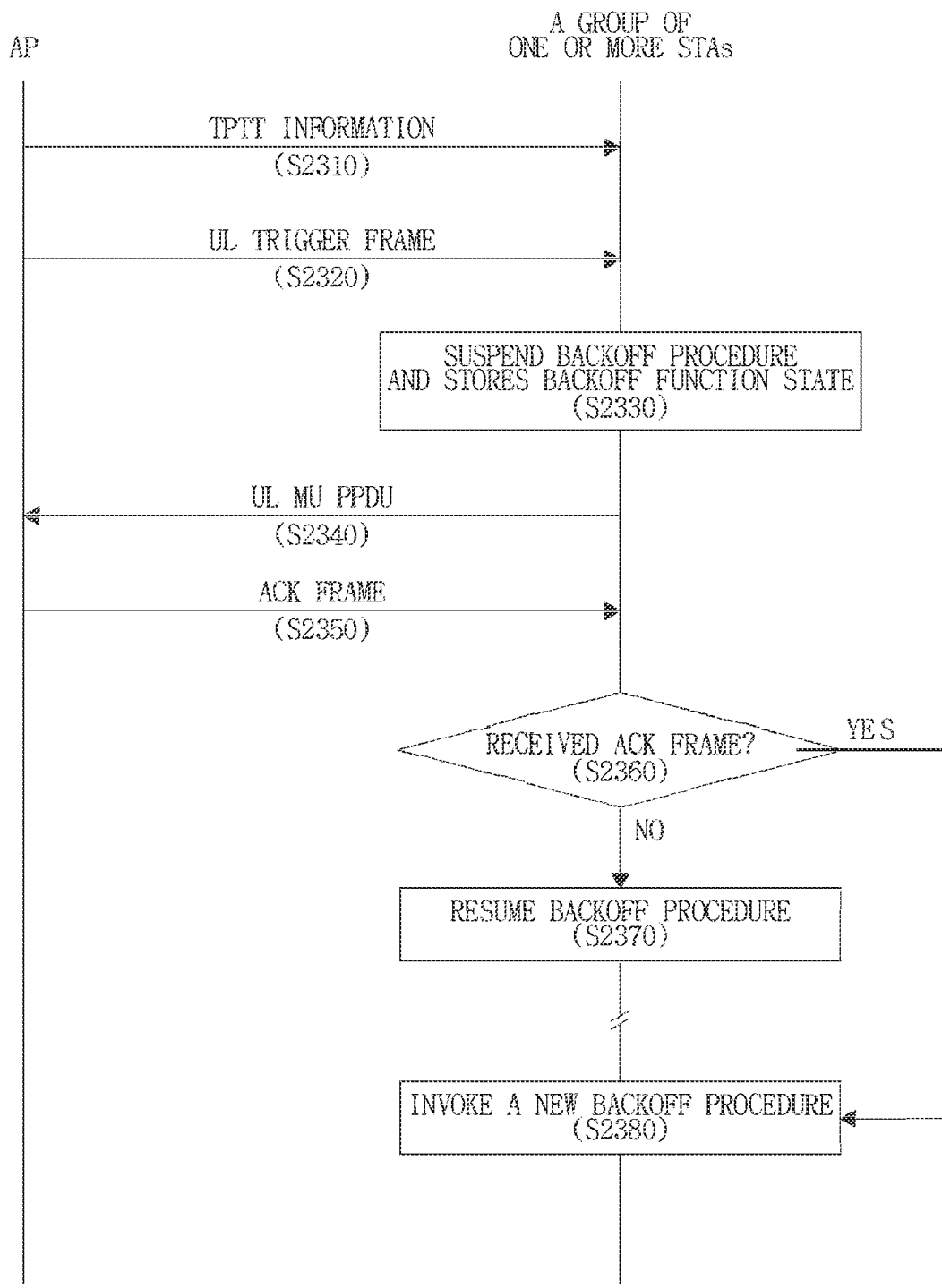
FIG. 23 depicts an exemplary operation of backoff procedure for UL MU transmissions according to the present disclosure.

FIG. 23 depicts an exemplary operation of backoff procedure for UL MU transmissions according to the present disclosure. For UL MU transmissions, an AP may transmit a UL trigger frame (e.g., a UL MU-MIMO Poll frame or a UL OFDMA Poll frame) to STAs. In response to the UL trigger frame, the STAs may transmit an UL MU PPDU as indicated by the trigger frame. The AP may transmit a control response frame to STAs that transmitted the UL MU PPDU. Such frame exchange sequence (i.e., UL trigger, UL MU transmission, and a control response frame) may be performed within a duration of a TXOP.

In step S2310, an AP may transmit Target Poll Transmission Time (TPTT) information to a group of one or more STAs. Specifically, an AP may configure or determine a transmission time of a UL trigger frame (or a UL MU-MIMO/OFDMA Poll frame), and an expected transmission time of a UL trigger frame (or a UL MU-MIMO/OFDMA Poll frame) may be referred to as a TPTT. An AP may configure or determine one or more TPTTs. At a TPTT, the AP may schedule a UL trigger frame (or a UL MU-MIMO/OFDMA Poll frame) transmission. A TPTT information element specifying information indicating one or more TPTTs may be included in a Beacon frame.

A TPTT information element may specify a Target Beacon Transmission Time (TBTT). For example, a TPTT indicated by the TPTT information element may be specified by a number of TBTTs or may be specified by an offset to a certain TBTT (e.g., a next TBTT).

A STA receiving a Beacon frame including a TPTT information element may listen to a UL trigger frame (or a UL MU-MIMO/OFDMA Poll frame) transmitted at each of one or more TPTTs as indicated by the TPTT information element. A TPTT may be configured within a TXOP. However, a TXOP holder may not extend TXOP to include a TPTT to improve a throughput and energy efficiency of a STA. Specifically, a TXOP holder may not change a duration of TXOP that has been already obtained by or granted to the TXOP holder, if the changed duration of the TXOP overlaps a TPTT. For example, if a STA receiving a Beacon frame including the TPTT information element already owns a TXOP before the TPTT, the STA may not be allowed to extend the corresponding TXOP by crossing the TPTT. Here, a STA may consider TPTT information provided by a BSS with which the STA is associated, but the STA may disregard or discard TPTT information provided by a different BSS with which the STA is not associated.

In step S2320, the AP may transmit a UL trigger frame at a TPTT. The UL trigger frame may include user identification information that specify one or more STAs being elicited to transmit an UL MU PPDU. In addition, a UL trigger frame (or a UL MU-MIMO/OFDMA Poll frame) may be used for invoke a UL MU transmission from anonymous users. For example, a UL trigger frame may include an empty list of the granted STAs. That is, a UL trigger frame may be used for allowing random access of unspecified STAs to participate in an UL MU transmission on resources allocated by the UL trigger frame. A Beacon frame may indicate one or more TPTTs of one or more UL trigger frames that allocate resources for random access.

A UL trigger frame without any condition for participating in a UL MU transmission may invoke a UL MU transmission of anonymous users. However, a UL trigger frame may include a certain condition for participating in the UL MU transmission. Accordingly, among anonymous users, STAs being allowed to participate in the UL MU transmission may be restricted to a group of candidate STAs that satisfy the condition included in the UL trigger frame.

For example, one of conditions to restrict the candidate STAs participating in the UL MU transmission may cover or include one or more access categories for the UL MU transmission. When a UL trigger frame for a UL MU transmission from anonymous users (e.g., a UL trigger frame without user identification information) includes information indicating a certain access category, an STA having a buffered frame matching the access category included in the UL trigger frame are eligible to respond to the UL trigger frame and may participate in the UL MU transmission.

In step S2330, an STA may suspend backoff procedure and store backoff function state at the TPTT or at receiving the UL trigger frame. Specifically, an STA performing channel access according to EDCA scheme may perform a backoff procedure on a channel in order to acquire a TXOP. Multiple STAs may perform channel access according to EDCA scheme at the same time based on their own EDCA parameters (e.g., backoff counter, Contention Window (CW), QoS Short Retry Counter (QSRC), QoS Long Retry Counter (QLRC), etc.). While STAs are performing backoff procedures on their own, at TPTT or at a reception time of the UL trigger frame, each STA performing channel access according to EDCA scheme may suspend an operation of its EDCA Function (EDCAF), and stores backoff function state of EDCA parameters (e.g., backoff counter value, CW for an access category (CW[AC]), QSRC for an access category (QSRC[AC]), QLRC for an access category (QLRC[AC]), etc.).

In step S2340, STAs may transmit a UL MU PPDU to the AP. For example, the STAs participating in the UL MU transmission may be identified by the UL trigger frame. Additionally or alternatively, the STAs participating in the UL MU transmission may be unidentified by the UL trigger frame (i.e., the UL trigger frame elicits UL MU transmission using random access). Also, resource units for transmitting UL MU PPDU may be indicated by the UL trigger frame. For example, resource unit(s) (or subchannel(s)) may be explicitly allocated to one or more identified STAs participating in the UL MU transmission.

Additionally or alternatively, resource unit(s) (or subchannel(s)) may be randomly selected, among resource units allocated for random access by the UL trigger frame, by anonymous users that are eligible to participate in the UL MU transmission. Further examples of resource unit selection for UL random access will be described with referring to FIGS. 24 and 25.

In step S2350, the AP may transmit an ACK frame to STAs. Here, the AP may transmit an ACK frame in response to successfully received UL MU transmission. For example, if a collision occurs among UL transmissions of multiple STAs, the AP may not receive the UL transmission and no ACK frame is transmitted to those STAs.

In step S2360, each STA that has transmitted the UL MU PPDU determines if an ACK frame is received. If a STA has failed to receive the ACK frame, the STA may resume backoff procedure that has been suspended in step S2370. If an STA has received an ACK frame, the STA may invoke a new backoff procedure to acquire TXOP in step S2380.

Alternatively or additionally, without checking the successful reception of the ACK frame as in step S2360, at the end of the TXOP controlled or initiated by the UL trigger frame, an STA may restore the previously stored backoff function state and may resume an operation of EDCAF as in step S2370. If the previously stored backoff function state is empty for an STA resuming a backoff procedure at the end of the TXOP, the EDCAF of the STA may invoke a backoff procedure, even if no additional transmissions are currently queued as in step S2380.

Alternatively or additionally, the backoff function state may be changed at the end of a TXOP. For example, the backoff function state may be changed based on the traffic load or congestion state. A UL MU transmission from anonymous users may be successful when the traffic load or congestion is not heavy (i.e., when the traffic load is not greater than a reference). A UL MU transmission from anonymous users may not be successful when the traffic load or congestion is heavy (i.e., when the traffic load is greater than the reference). Specifically, if the traffic load or congestion is not heavy, or after the successful transmission of a UL MU PPDU, each STA performing EDCA access may reset backoff function state (e.g., backoff counter, CW[AC], QSRC[AC], QLRC[AC], etc.) instead of unchanging (or restoring) its previously stored backoff function state. If the traffic load or congestion is heavy, or after the transmission failure of a UL MU PPDU, each STA performing EDCA access may increase backoff function state (e.g., backoff counter, CW[AC], QSRC[AC], QLRC[AC], etc.) instead of unchanging (or restoring) its previously stored backoff function state.

Alternatively or additionally, for the UL random access mechanism, if an STA has failed to receive an ACK frame, the STA may invoke a backoff procedure with a new backoff counter value. An exemplary operation of this example will be given with referring to FIG. 24.

Figure 24:
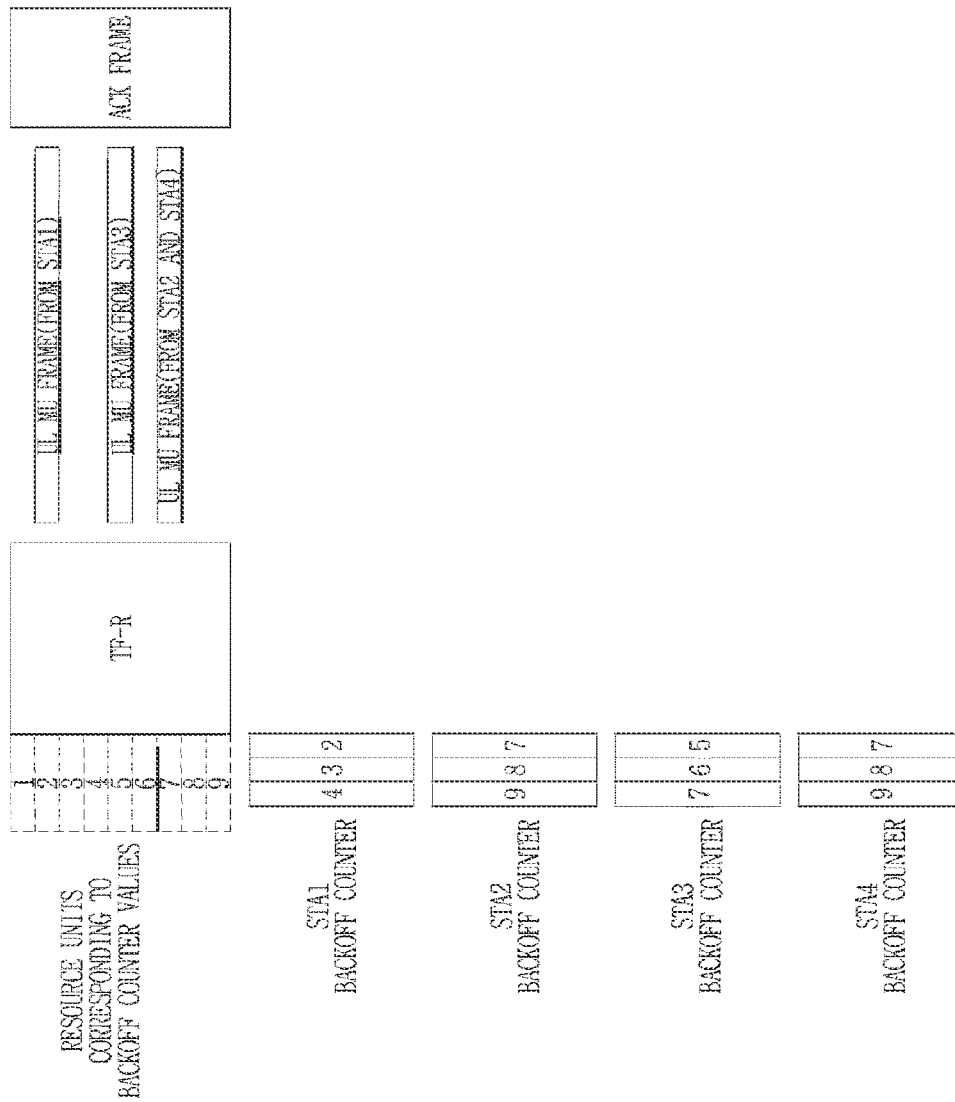
FIG. 24 depicts an exemplary operation of backoff procedure for UL random access according to the present disclosure.

FIG. 24 depicts an exemplary operation of backoff procedure for UL random access according to the present disclosure. When a UL trigger frame indicates that anonymous users are eligible to participate in a UL MU transmission, the UL trigger frame may include information indicating resource unit(s) (or subchannel(s)) for random access. STAs that are eligible to participate in a UL MU transmission in a random access manner may randomly select one or more resource units (or one or more subchannels) among the resource unit(s) (or subchannel(s)) indicated by the UL trigger frame. After random selection of resource units, the STAs may start UL MU transmission a SIFS after the UL trigger frame.

Random selection of a resource unit may be based on a backoff counter. Specifically, a backoff counter of an STA has a purely random property, so the backoff counter of the STA may be utilized for random selection of a resource unit. That is, an STA may select a resource unit using a function of backoff counter.

In the example of FIG. 24, STA1, STA2, STA3 and STA4 perform UL random access based on OFDMA. An AP may transmit a UL trigger frame eliciting UL random access from anonymous users. The trigger frame for random access may be referred to as TF-R. Before receiving the TF-R, STA1, STA2, STA3 and STA4 may be performing backoff procedures. That is, each STA randomly selects a backoff counter and counts down a value of the backoff counter when the medium is idle during a backoff slot. In the example of FIG. 24, STA1 selects a backoff countervalue 4, STA2 selects a backoff countervalue 9, STA3 selects a backoff counter value 7, STA4 selects a backoff counter value 9, and each STA counts down its own backoff counter.

At TPTT or at receiving a TF-R, STAs may suspend their backoff procedures and store backoff function state at the TPTT or at receiving the UL trigger frame. Before transmitting a UL MU PPDU in response to the TF-R, an STA may select a resource unit (or a subchannel) used for transmitting a UL MU frame in an OFDMA manner. In the example of FIG. 24, STA1 stores a backoff counter value of 2 at receiving the TF-R, it may choose a resource unit 2 (subchannel 2) which corresponds to the backoff counter value 2. STA2 stores a backoff counter value of 7 at receiving the TF-R, it may choose a resource unit 7 (subchannel 7) which corresponds to the backoff counter value 7. STA3 stores a backoff counter value of 5 at receiving the TF-R, it may choose a resource unit 5 (subchannel 5) which corresponds to the backoff counter value 5. STA2 stores a backoff counter value of 7 at receiving the TF-R, it may choose a resource unit 7 (subchannel 7) which corresponds to the backoff counter value 7. The mapping relationship between the resource units and backoff counter values is exemplary, without limiting the present disclosure.

STA1 may transmit a UL MU frame on resource unit 2 and STA3 may transmit a UL MU frame on resource unit 3. STA1 and STA3 may receive ACK frames successfully. However, STA2 and STA4 may transmit a UL MU frame on the same resource unit 7. In other words, a collision occurs when STA2 and STA4 perform UL MU transmission. In that case, an AP may not successfully receive a UL MU frame from STA2 and STA4 and no ACK frame may be provided to STA2 and STA4.

STA2 and STA4 may determine that a collision has occurred in their UL random access based on a missing ACK frame. Since STA2 and STA4 used the same backoff counter value for choosing resource units for random access and stored the backoff counter value at receiving TF-R, a collision may occur again when STA2 and STA4 reuse the stored backoff counter.

To avoid such a collision, an STA that has failed in receiving an ACK frame in response to UL random access transmission may randomly select its backoff counter (i.e., use new backoff counter) when it resumes the backoff procedure. In the example of FIG. 24, STA2 uses a new backoff counter 4 when resuming a backoff procedure instead of using the stored backoff counter value 7. STA4 uses a new backoff counter 8 when resuming a backoff procedure instead of using the stored backoff counter value 7.

According to the present disclosure, an STA may perform CCA on the resource units allocated for UL random access before selecting a resource unit. Specifically, after receiving a TF-R including resource unit allocation information for UL random access, an STA may check CCA on resource units (or subchannels) allowed for UL random access.

For example, an operation indicated as following a), b) and c) may be applied for an STA selecting resource unit (or subchannel) for UL random access.
  a) An STA may check CCA on the subchannels allocated by the UL trigger frame, resulting in at least one idle subchannel is present.
  b) The STA may select a subchannel from the at least one idle subchannel.
  c) The STA may transmit a UL MU frame on the selected subchannel.

The above operation of a), b) and c) is a subchannel selection based on a non-uniform random property. To improve fairness in subchannel selection, an alternative operation indicated as following d), e) and f) may be applied for an STA selecting a resource unit (or subchannel) for UL random access.
  d) An STA may check CCA on the subchannels allocated by the UL trigger frame, resulting in at least one idle subchannel is present.
  e) If all of the at least one subchannel is idle, the STA may select a subchannel from the at least one idle subchannel; otherwise, the STA may not perform anything or may not be allowed to begin any transmission.
  f) The STA may transmit a UL MU frame on the selected subchannel.

The above operation of d), e) and f) allows a subchannel selection only when all subchannels are idle and has a low random channel access probability. To improve a random access probability, another alternative operation indicated as following g), h) and i) may be applied for an STA selecting resource unit (or subchannel) for UL random access.
  g) An STA may check CCA on the subchannels allocated by the UL trigger frame, resulting in at least one idle subchannel is present.
  h) The STA may select a subchannel from all subchannels (including both idle subchannel(s) and busy subchannel(s)).
  i) If the selected subchannel is idle, the STA may transmit a UL MU frame on the selected subchannel; Otherwise, the STA may not perform anything or may not be allowed to begin any transmission.

Additionally or alternatively, an STA may not perform CCA on the resource units allocated for UL random access before selecting a resource unit. Specifically, after receiving a TF-R including resource unit allocation information for UL random access, an STA may not check any CCA. For example, an operation indicated as following j) and k) may be applied for an STA selecting resource unit (or subchannel) for UL random access.
  j) An STA may not check any CCA on the subchannels allocated by the UL trigger frame, and the STA may select a subchannel from all subchannels (including both idle subchannel(s) and busy subchannel(s)) among the subchannels allocated by the UL trigger frame, regardless of CCA.
  k) The STA may transmit a UL MU frame on the selected subchannel. For the UL random access, if a STA decides to transmit an UL MU frame on the selected sub-channel, the STA may transmit the UL MU frame to AP from which it receives a TF-R frame.

Now, a description will be given of the features of UL random access in a dynamic frequency selection (DFS) channel. DFS are features mandated to satisfy requirements in some regulatory domains for radar detection and uniform channel spreading in the 5 GHz band. DFS may also be used for other purposes, such as automatic frequency planning. DFS service provides association of STAs with an AP based on the STAs' supported channels, quieting the current channel so it can be tested for the presence of radar with less interference from other STAs, testing channels for radar before using a channel and while operating in a channel, discontinuing operations after detecting radar in the current channel to avoid interference with radar, detecting radar in the current and other channels based on regulatory requirements, requesting and reporting of measurements in the current and other channels, selecting and advertising a new channel to assist the migration of a BSS after radar is detected.

A UL OFDMA-based random access may be used in a DFS channel, when satisfying additional requirements for DFS. DFS requires that an STA must listen to a Beacon frame before accessing a wireless medium Based on the above, exemplary operation of an STA performing UL OFDMA-based random access will be described below, assuming that at least one subchannel among the subchannels allocated by a TF-R (or granted by an AP) occupies a DFS channel.

For a UL random access in channels including at least one DFS channel and zero or more non-DFS channels, an unassociated STA receiving a TF-R may randomly select a subchannel from all channels granted by the TF-R, if the STA has received a Beacon frame. If the STA has not received a Beacon frame, the STA may not perform anything on any channel granted by the TF-R (e.g., may not select a subchannel from any channel or may not begin any transmission on any channel).

According to the above example, the operation may be implemented in a simple manner, but the channel utilization efficiency may be degraded. For example, an unassociated STA that has not received a Beacon frame are not allowed to access a wireless medium even on a non-DFS channel. To improve the channel utilization efficiency, the following additional or alternative examples may be applied.

For a UL random access in channels including at least one DFS channel and zero or more non-DFS channels, an unassociated STA receiving a TF-R may randomly select a subchannel from non-DFS channels granted by the TF-R, if the STA has not received a Beacon frame. However, an unassociated STA receiving a TF-R may not perform anything on DFS channels granted by the TF-R (e.g., may not select a subchannel from DFS channels or may not begin any transmission on DFS channels), if the STA has not received a Beacon frame. In addition, an unassociated STA receiving a TF-R may randomly select a subchannel from all channels granted by the TF-R, if the STA has received a Beacon frame.

According to the above example, non-DFS channels may be more overloaded than DPS-channels. The difference of successful channel access probability between non-DFS channels and DFS channels may degrade the overall system performance. To improve the channel utilization fairness, the following additional or alternative examples may be applied.

For a UL random access in channels including at least one DFS channel and zero or more non-DFS channels, an unassociated STA receiving a TF-R may randomly select a subchannel from all channels granted by the TF-R. If the selected subchannel corresponds to DFS channels, an STA having received a Beacon frame is eligible for a UL random access. An STA that has not received a Beacon frame is not eligible for UL random access, and the STA may not perform anything on the selected subchannel (e.g., may not begin any transmission on the selected subchannel). If the selected subchannel corresponds to non-DFS channels, any STA, regardless of receiving a Beacon frame, is eligible for UL random access.

Figure 25:
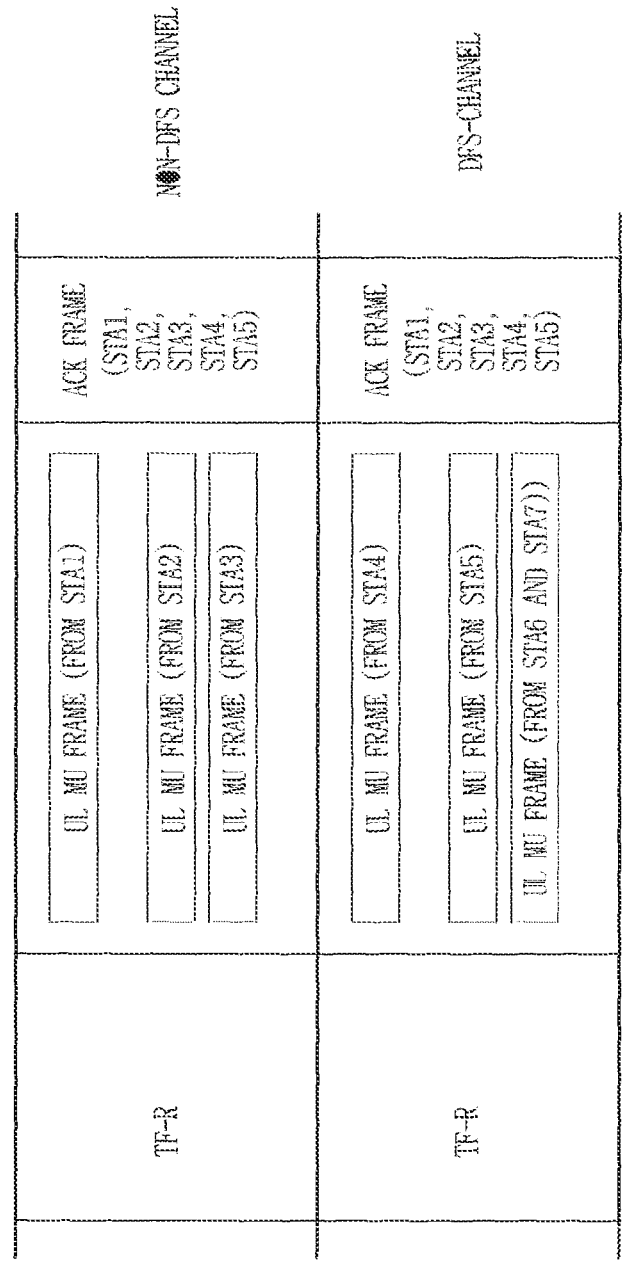
FIG. 25 depicts an exemplary operation of UL random access in DFS channel according to the present disclosure.

FIG. 25 depicts an exemplary operation of UL random access in DFS channel according to the present disclosure. In the example of FIG. 25, STA1 to STA7 receives TF-R from an AP, and performs UL MU transmission on the channels granted by the TF-R. For example, the channel granted by the TF-R may include a non-DFS channel and a DFS channel.

An STA receiving a TF-R on a non-DFS channel may select a subchannel from the non-DFS channel and transmit a UL MU frame on the selected channel in the non-DFS channel. An STA that has received a Beacon frame and receives a TF-R on a DFS channel may select a subchannel from the DFS channel and transmit a UL MU frame on the selected channel in the DFS channel.

In the example of FIG. 25, After receiving TF-R on a non-DFS channel, each of STA1, STA2 and STA3 may select a subchannel from the non-DFS channel and may transmit a UL MU frame on the selected subchannel. STA1, STA2 and STA3 may or may not have received a Beacon channel. After receiving TF-R on a DFS channel, each of STA4, STA5, STA6 and STA7 may select a subchannel from the DFS channel and may transmit a UL MU frame on the selected subchannel. STA4, STA5, STA6 and STAT may have received a Beacon channel.

The AP may transmit an ACK frame on the non-DFS channel and the DFS channel. The ACK frame includes acknowledgement information for STA1, STA2, STA3, STA4 and STA5. The ACK frame may be duplicated on two channels. Now, a description will be given of the features of enhanced multicast and broadcast service.

Multicast and broadcast service may have technical problems such as unreliable multicast, no backoff procedure, or the lowest PHY data rate. Specifically, the unreliable multicast means no ACK mechanism and retransmission mechanism are applicable to multicast and broadcast service and no mechanisms like RTS/CTS to solve the hidden node problem are applicable to multicast and broadcast service. The no backoff procedure includes that the multicast and broadcast service always uses fixed contention window size. The lowest PHY data rate includes that the multicast and broadcast service does not provide any PHY rate adaptation mechanism. To solve the above problems regarding the multicast and broadcast service, RF combining of CTS and ACK frames may be applied.

Figure 26:
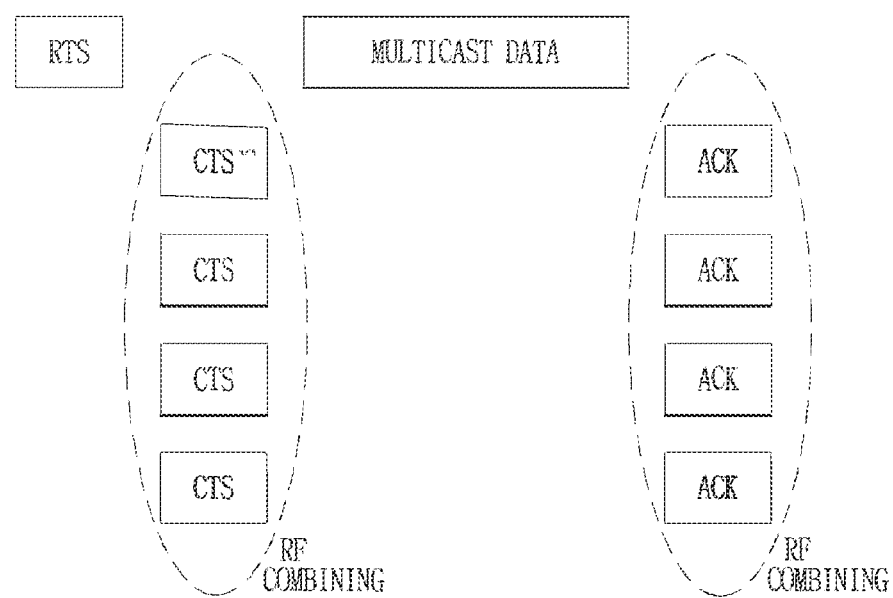
FIG. 26 depicts an exemplary RF combining mechanism for enhanced multicast and broadcast service according to the present disclosure.

FIG. 26 depicts an exemplary RF combining mechanism for enhanced multicast and broadcast service according to the present disclosure, which may be applicable to IEEE 802.11ax (HEW) environments. After receiving an RTS frame, the multicast and broadcast receivers may simultaneously transmit CTS frames. To use the RF combining, an initial state of the scrambler may be set to the same value with the initial state of the scrambler obtained from the previously received RTS frame. In addition, the Power Management (PM) bit and More Data (MD) bit of CTS frame may be set to 0.

After receiving a Multicast DATA frame, the multicast and broadcast receivers may simultaneously transmit ACK frames. To use RF combining, an initial state of the scrambler may be set to the same value with the initial state of the scrambler obtained from the previously received Multicast DATA frame. In addition, the Power Management (PM) bit and More Data (MD) bit of ACK frame may be set to 0.

If an AP transmitting a RTS or a Multicast DATA frame does not receive a CTS or ACK frame in response to the RTS or the Multicast DATA frame, the AP may perform a backoff procedure with a randomly selected new backoff counter to retransmit the unresponsive RTS or the unresponsive Multicast DATA frame.

In addition, the RTS frame may include signaling information indicating simultaneous transmission of CTS frames, such RTS may be referred to as new Multicast RTS. Multicast DATA frames may include signaling information indicating simultaneous transmission of ACK frames. For example, a Multicast DATA frame may include a Duration field set to an ACK transmission time (ACKTxTime). When the Duration field of the Multicast DATA frame is set to a non-zero value, the STAs having the multicast address membership may simultaneously respond with the ACK frame.

While the afore-described exemplary methods of the present disclosure have been described as a series of operations for simplicity of description, this does not limit the sequence of steps. In some embodiments, steps may be performed at the same time or in a different sequence. All of the exemplary steps are not always necessary to implement the method proposed by the present disclosure.

The foregoing embodiments of the present disclosure may be implemented separately or combinations of two or more of the embodiments may be implemented simultaneously, for the afore-described exemplary methods of the present disclosure.

The present disclosure includes an apparatus for processing or performing the method of the present disclosure (e.g., the wireless device and its components described with reference to FIGS. 1, 2, and 3).

The present disclosure includes software or machine-executable instructions (e.g., an operating system (OS), an application, firmware, a program, etc.) for executing the method of the present disclosure in a device or a computer, and a non-transitory computer-readable medium storing the software or instructions that can be executed in a device or a computer.

While various embodiments of the present disclosure have been described in the context of an IEEE 802.11 system, they are applicable to various mobile communication systems. The embodiments of the invention described above are intended to be merely exemplary; numerous variations and modifications will be apparent to those skilled in the art. Such variations and modifications are intended to be within the scope of the present invention as defined by any of the appended claims.

What is claimed is:

1. A method for a backoff process for uplink (UL) random access in a WiFi wireless network, comprising:
receiving, by a station (STA) eligible to participate in a UL MU transmission, a UL trigger frame indicating that one or more anonymous users are eligible to participate in the UL multiuser (MU) transmission, the UL trigger frame including a condition for participating in the UL MU transmission;
in response to the condition is fulfilled:
randomly selecting, by the STA, one or more resource units (RUs) based on a value of a randomly selected backoff counter; and
transmitting, by the STA, the UL MU transmission.

2. The method of claim 1, wherein the UL trigger frame includes information indicating one or more RUs to be used for random access.

3. The method of claim 1, wherein the one or more RUs are indicated by the UL trigger frame.

4. The method of claim 1, wherein the STA initiates the transmitting a short interframe space (SIFS) following the UL trigger frame.

5. The method of claim 1, wherein the UL trigger frame is received from an access point (AP).

6. The method of claim 1, further comprising:
performing, by the STA, a backoff procedure prior to receiving the UL trigger frame.

7. The method of claim 6, wherein the backoff procedures comprises:
randomly selecting, by the STA, a backoff counter; and
counting down the selected backoff counter in response to a transmission medium is idle during a backoff slot.

8. The method of claim 6, wherein in response to receiving the UL trigger frame, the method further comprises:
suspending, by the STA, the backoff procedure; and
storing, by the STA, a backoff function state.

9. The method of claim 1, wherein the condition includes information related to an access category.

10. A station (STA) for facilitating multi-user communication in a WiFi wireless network, the station comprising:
one or more memories; and
one or more processors coupled to the one or more memories, the one or more processors configured to:
receive, by the STA, an uplink (UL) trigger frame;
determine the UL trigger frame includes an indication that one or more anonymous users are eligible to participate in a UL multiuser (MU) transmission, wherein the UL trigger frame includes a condition to participate in the UL MU transmission;
in response to the condition is fulfilled:
randomly select one or more resource units (RUs) based on a value of a randomly selected backoff counter; and
transmit the UL MU transmission.

11. The station of claim 10, wherein the UL trigger frame includes information indicating one or more RUs to be used for random access.

12. The station of claim 10, wherein the one or more RUs are indicated by the UL trigger frame.

13. The station of claim 10, wherein the STA initiates the transmission a short interframe space (SIFS) following the UL trigger frame.

14. The station of claim 10, wherein the UL trigger frame is received from an access point (AP).

15. The station of claim 10, wherein the STA performs a backoff procedure prior to the STA receives the UL trigger frame.

16. The station of claim 15, wherein the backoff procedure includes the STA randomly selects a backoff counter and counts down the selected backoff counter in response to a transmission medium is idle during a backoff slot.

17. The station of claim 15, wherein in response to receiving the UL trigger frame, the STA suspends the backoff procedure and stores a backoff function state.

18. The STA of claim 10, wherein the condition includes information related to an access category.

19. A non-transitory computer-readable storage medium storing computer executable instructions that, when executed by one or more processors in a WiFi wireless network, cause the one or more processors to perform:
receiving, by a station (STA) eligible to participate in a UL MU transmission, a UL trigger frame indicating that one or more anonymous users are eligible to participate in the UL multiuser (MU) transmission, the UL trigger frame including a condition for participating in the UL MU transmission;
in response to the condition is fulfilled:
randomly selecting, by the STA, one or more resource units (RUs) based on a value of a randomly selected backoff counter; and
transmitting, by the STA, the UL MU transmission.

20. The non-transitory computer-readable storage medium of claim 19 wherein the UL trigger frame includes information indicating one or more RUs to be used for random access.

21. The non-transitory computer-readable storage medium of claim 19, wherein the one or more RUs are indicated by the UL trigger frame.

22. The non-transitory computer-readable storage medium of claim 19, wherein the STA initiates the transmitting a short interframe space (SIFS) following the UL trigger frame.

23. The non-transitory computer-readable storage medium of claim 19, wherein the UL trigger frame is received from an access point (AP).

24. The non-transitory computer-readable storage medium of claim 19, wherein the instructions cause the processor to further perform:
   performing, by the STA, a backoff procedure prior to receiving the UL trigger frame.

25. The non-transitory computer-readable storage medium of claim 24, wherein the backoff procedures comprises:
   randomly selecting, by the STA, a backoff counter; and
   counting down the selected backoff counter in response to a transmission medium is idle during a backoff slot.

26. The non-transitory computer-readable storage medium of claim 24, wherein in response to receiving the UL trigger frame, the method further comprises:
   suspending, by the STA, the backoff procedure; and
   storing, by the STA, a backoff function state.

27. The non-transitory computer-readable storage medium of claim 19, wherein the condition includes information related to an access category.

* * * * *